US012631928B2

(12) United States Patent
Yashiro et al.

(10) Patent No.: US 12,631,928 B2
(45) Date of Patent: May 19, 2026

(54) CURVED SURFACE RESIN STRUCTURE, ELECTRONIC LIGHT CONTROL LENS, AND METHOD FOR PRODUCING CURVED SURFACE RESIN STRUCTURE

(71) Applicants: Tohru Yashiro, Kanagawa (JP); Yukihiro Wakabayashi, Kanagawa (JP)

(72) Inventors: Tohru Yashiro, Kanagawa (JP); Yukihiro Wakabayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 340 days.

(21) Appl. No.: 18/550,492

(22) PCT Filed: Mar. 16, 2022

(86) PCT No.: PCT/IB2022/052352
§ 371 (c)(1),
(2) Date: Sep. 14, 2023

(87) PCT Pub. No.: WO2022/200920
PCT Pub. Date: Sep. 29, 2022

(65) Prior Publication Data

US 2024/0168352 A1 May 23, 2024

(30) Foreign Application Priority Data

Mar. 23, 2021 (JP) ................................ 2021-048695
Mar. 10, 2022 (JP) ................................ 2022-037088

(51) Int. Cl.
*G02F 1/157* (2006.01)
*B29C 45/00* (2006.01)
(Continued)

(52) U.S. Cl.
CPC .......... *G02F 1/157* (2013.01); *B29C 45/0001* (2013.01); *B29C 45/1642* (2013.01);
(Continued)

(58) Field of Classification Search
None
See application file for complete search history.

(56) References Cited

U.S. PATENT DOCUMENTS

2011/0222139 A1 9/2011 Naijo et al.
2011/0279884 A1 11/2011 Fujimura et al.
(Continued)

FOREIGN PATENT DOCUMENTS

EP 3498452 A2 6/2019
EP 3711920 A1 9/2020
JP 2020-157759 A 10/2020

OTHER PUBLICATIONS

International Search Report and Written Opinion issued on May 31, 2022 in PCT/IB2022/052352 filed on Mar. 16, 2022.

*Primary Examiner* — Richard H Kim
(74) *Attorney, Agent, or Firm* — Grüneberg Global IP, PLLC

(57) ABSTRACT

A curved surface resin structure includes a support, and a laminate section within a plane of the support, where at least a conductive layer and an electronic material layer are laminated in the laminate section. A surface curvature radius rA1 (mm) of end of the laminate section, a surface curvature radius rA2 (mm) of another end of the laminate section facing the one end with a center region of the laminate section present at a middle point, and an average curvature a radius rB (mm) of a surface of the laminate section satisfy Inequality (1): rA1, rA2<rB, or Inequality (2): rA1, rA2>rB.

12 Claims, 10 Drawing Sheets

(51) Int. Cl.

| | |
|---|---|
| ***B29C 45/14*** | (2006.01) |
| ***B29C 45/16*** | (2006.01) |
| ***B29K 69/00*** | (2006.01) |
| ***B29K 663/00*** | (2006.01) |
| ***B29L 11/00*** | (2006.01) |

(52) U.S. Cl.
CPC .... *B29C 45/1671* (2013.01); *B29C 45/14221* (2013.01); *B29C 2045/169* (2013.01); *B29K 2069/00* (2013.01); *B29K 2663/00* (2013.01); *B29K 2995/0005* (2013.01); *B29L 2011/0016* (2013.01)

(56) References Cited

U.S. PATENT DOCUMENTS

| | | | |
|---|---|---|---|
| 2012/0033286 | A1 | 2/2012 | Yashiro et al. |
| 2012/0139824 | A1 | 6/2012 | Takahashi et al. |
| 2012/0139825 | A1 | 6/2012 | Yashiro et al. |
| 2012/0154892 | A1 | 6/2012 | Yashiro et al. |
| 2012/0194894 | A1 | 8/2012 | Yashiro et al. |
| 2013/0250394 | A1 | 9/2013 | Okada et al. |
| 2013/0258439 | A1 | 10/2013 | Naijo et al. |
| 2013/0335802 | A1 | 12/2013 | Kim et al. |
| 2014/0078569 | A1 | 3/2014 | Takahashi et al. |
| 2014/0268284 | A1 | 9/2014 | Naijo et al. |
| 2015/0198857 | A1 | 7/2015 | Yashiro et al. |
| 2015/0274761 | A1 | 10/2015 | Sagisaka et al. |
| 2015/0331295 | A1 | 11/2015 | Takahashi et al. |
| 2015/0378233 | A1 | 12/2015 | Fujimura et al. |
| 2016/0108072 | A1 | 4/2016 | Inoue et al. |
| 2016/0209721 | A1 | 7/2016 | Matsumoto et al. |
| 2017/0010514 | A1 | 1/2017 | Yashiro et al. |
| 2017/0131609 | A1 | 5/2017 | Okada et al. |
| 2017/0168366 | A1 | 6/2017 | Shinoda et al. |
| 2017/0176833 | A1 | 6/2017 | Goto et al. |
| 2017/0226413 | A1 | 8/2017 | Goto et al. |
| 2017/0235203 | A1 | 8/2017 | Yamamoto et al. |
| 2017/0329197 | A1 | 11/2017 | Yashiro et al. |
| 2017/0329198 | A1 | 11/2017 | Matsuoka et al. |
| 2017/0329199 | A1 | 11/2017 | Yashiro et al. |
| 2018/0017835 | A1 | 1/2018 | Kim et al. |
| 2018/0044581 | A1 | 2/2018 | Sagisaka et al. |
| 2018/0113366 | A1 | 4/2018 | Kaneko et al. |
| 2018/0173070 | A1 | 6/2018 | Yamamoto et al. |
| 2018/0231857 | A1 | 8/2018 | Kim et al. |
| 2018/0299740 | A1 | 10/2018 | Takeuchi et al. |
| 2018/0314125 | A1 | 11/2018 | Goto et al. |
| 2019/0184694 | A1 | 6/2019 | Yashiro et al. |
| 2019/0227401 | A1 | 7/2019 | Yutani et al. |
| 2020/0052254 | A1 | 2/2020 | Ohshima et al. |
| 2020/0103718 | A1 | 4/2020 | Okada et al. |
| 2020/0301226 | A1 | 9/2020 | Yashiro et al. |
| 2020/0301227 | A1 | 9/2020 | Takahashi et al. |
| 2020/0301229 | A1 | 9/2020 | Yashiro et al. |
| 2021/0032531 | A1 | 2/2021 | Kaneko et al. |
| 2021/0165296 | A1 | 6/2021 | Yutani et al. |
| 2022/0035218 | A1 | 2/2022 | Yutani et al. |

COMPARATIVE EXAMPLE

CURVED SURFACE RESIN STRUCTURE, ELECTRONIC LIGHT CONTROL LENS, AND METHOD FOR PRODUCING CURVED SURFACE RESIN STRUCTURE

CROSS-REFERENCE TO RELATED APPLICATIONS

This application is the National Stage entry under § 371 of International Application No. PCT/IB2022/052352, files on Mar. 16, 2022, and which claims the benefit of priority to Japanese Application No. 2021-048695, filed on Mar. 23, 2021, and priority to Japanese Application No. 2022-037088, filed on Mar. 10, 2022. The content of each of these applications is hereby incorporated by reference in its entirety.

TECHNICAL FIELD

The present disclosure relates to a curved surface resin structure, an electronic light control lens, and a method for producing a curved surface resin structure.

BACKGROUND ART

Insertion molding techniques using decorative films have been known as techniques for decorating surfaces of plastic products. The techniques set a decorative film on which, for example, a design print has been previously formed, in injection molding dies, and inject and weld a resin on the back surface of the decorative film, to form an integrally molded plastic product having the decorative film on the surface.

Compared with the method for pasting a decorative film on the surface of a product, the insertion molding techniques can enhance the design property of the product and productivity in terms of, for example, a seamless surface, reduction of parts by integration, and space-saving. Therefore, the insertion molding techniques are applied to production of, for example, interior parts of automobiles, and smartphone covers.

In recent years, attempts have been made to insertion-mold a conductive layer-including sheet serving as an insert sheet corresponding to the decorative film, to produce a wearable electronic device such as a touch panel or a display. Depending on what the electronic device is used for, it may be desirable to use a conductive layer having a high translucency (transparency) in the electronic device.

In the wearable applications, curved surface resin structures that are lightweight, hardly crack, and have stereoscopic shapes such as curved surface shapes excellent in design property and wearability are desirable for electronic devices.

As the curved surface resin structure, a proposed curved surface resin structure intended for suppressing damages of the conductive layer in a high-temperature environment includes: a conductive layer; a foundation layer containing a first resin and inorganic particles; a support containing a second resin; and a resin layer containing a third resin, which is either or both of a resin that is the same kind as the second resin and a resin having a softening temperature lower than or equal to the softening temperature of the second resin in this order (for example, see PTL 1).

CITATION LIST

Patent Literature

PTL 1

Japanese Unexamined Patent Application Publication No. 2020-157759

SUMMARY OF INVENTION

Technical Problem

The present disclosure has an object to provide a curved surface resin structure that has an excellent curved surface shape accuracy and can suppress damages of a conductive layer.

Solution to Problem

According to an embodiment of the present disclosure, a curved surface resin structure includes a support, and a laminate section within a plane of the support, at least a conductive layer and an electronic material layer being laminated in the laminate section. A surface curvature radius rA1 (mm) of one end of the laminate section, a surface curvature radius rA2 (mm) of another end of the laminate section facing the one end with a center region of the laminate section present at a middle point, and an average curvature radius rB (mm) of a surface of the laminate section satisfy Inequality (1) below or Inequality (2) below:

$$rA1, rA2 < rB \quad \text{Inequality (1);}$$

$$rA1, rA2 > rB \quad \text{Inequality (2).}$$

Advantageous Effects of Invention

The present disclosure can provide a curved surface resin structure that has an excellent curved surface shape accuracy and can suppress damages of a conductive layer.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1A:
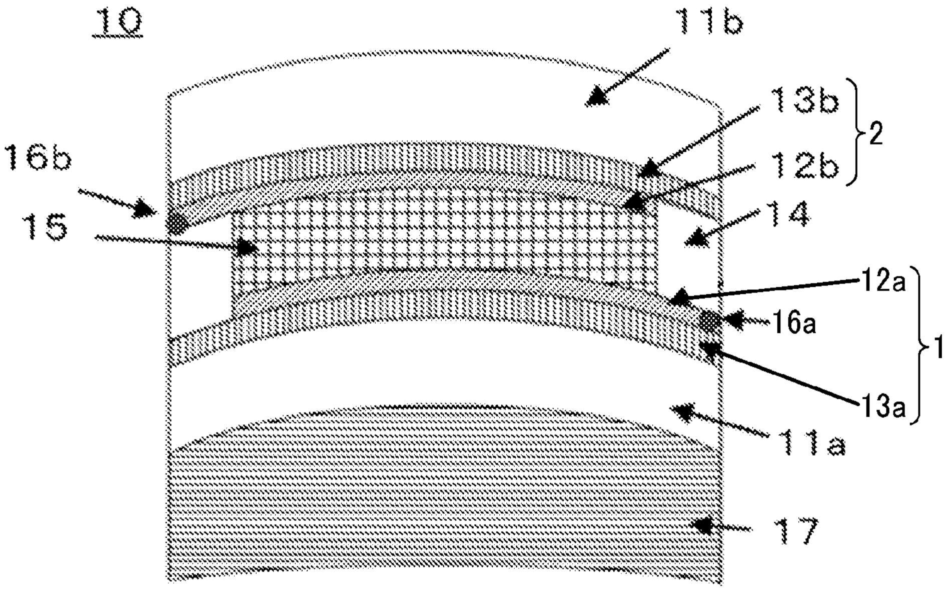
FIG. 1A is a schematic side view of a curved surface resin structure according to a first embodiment.

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

(Curved Surface Resin Structure)

A curved surface resin structure of the present disclosure includes a support, and a laminate section within a plane of the support, at least a conductive layer and an electronic material layer being laminated in the laminate section. The curved surface resin structure preferably includes a seal member and a foundation layer, and further includes other members as needed.

In the curved surface resin structure of the present disclosure, the support has a curved surface shape.

The present disclosure is based on a finding that conductive layers and electronic material layers of existing curved surface resin structures may be damaged when the curved surface resin structures are produced with a high curved surface accuracy.

Coating on decorative films used in insertion molding is applied on films having a flat plate shape. Therefore, compared with coating on surfaces of products having stereoscopic shapes such as curved surface shapes, coating on decorative films does not need dedicated equipment and is low-cost. Moreover, coating on decorative films does not need dipping coating as a measure for coating on a stepped portion and is advantageous because the amount of the coating solvent used is low.

Hence, production of electronic devices by insertion molding enables mass production at low costs at a high productivity.

However, existing insertion molding techniques inject and weld a resin material, which is the same material as the resin material constituting a support on which a conductive layer is formed, to the support at a high temperature (for example, about 200 degrees C.). Therefore, a problem arises that the electronic device is often broken by heat, or shearing stress of the injected resin. Specifically, existing insertion molding techniques have a problem that deformation of the support due to heat may generate a crack in the conductive layer formed on the support, and the conductive layer may be damaged.

Existing insertion molding techniques formed a specific foundation layer between the support and the conductive layer in order to suppress crack damages, because existing insertion molding technique have found it a problem that a conductive layer formed of an inorganic oxide and hence having a high Young’s modulus and no toughness is brittle, easily breaks, cannot follow thermal expansion of the support during molding, and is hard to mold without crack damages.

However, a laminate section in which a conductive layer and an electronic material layer are laminated is softer than other regions such as a seal member than the laminate section. Therefore, there is a problem that the laminate section is strained and the conductive layer and the electronic material layer are damaged under high heat and pressure loads applied during curving processing for, for example, optical lenses that need a high curved surface accuracy (e.g., a surface displacement of 20 micrometers or less).

As described above, when using a conductive layer excellent in transparency and conductivity, existing curved surface resin structures have a problem that they cannot realize an excellent curved surface shape accuracy due to damages of the conductive layer and the electronic material layer when exposed to a high-temperature, high-pressure environment during, for example, production by insertion molding.

The curved surface resin structure of the present disclosure includes a support, and a laminate section within a plane of the support, at least a conductive layer and an electronic material layer being laminated in the laminate section. A surface curvature radius rA1 (mm) of one end of the laminate section, a surface curvature radius rA2 (mm) of another end of the laminate section facing the one end with a center region of the laminate section present at a middle point, and an average curvature radius rB (mm) of a surface of the laminate section satisfy Inequality (1) below or Inequality (2) below:

$$rA1,rA2<rB \quad \text{Inequality (1);}$$

$$rA1,rA2>rB \quad \text{Inequality (2).}$$

The surface curvature radius can be measured with, for example, a surface roughness tester (FORM TALYSURF SERIES 2 available from Taylor Hobson, Inc.).

The center region may be a center of gravity or a geometric center of gravity. The size of the center region is preferably less than or equal to 1/10 of the area of the laminate section.

The curved surface resin structure of the present disclosure includes a support, and a laminate section within a plane of the support, at least a conductive layer and an electronic material layer being laminated in the laminate section. The curved surface resin structure has a vertical surface displacement of 0.8 micrometers or greater at the boundary between a portion of the support on which the laminate section is not formed and the laminate section.

The curved surface resin structure of the present disclosure has a curved surface approximately uniformly displaced with respect to the center of the laminate section. Therefore, a better optical property can be obtained at the center that is used more frequently. In the present disclosure, an equal to or greater than 0.8 micrometer surface displacement formed at the boundary between a portion of the support on which the laminate section is not formed and the laminate section can suppress excessive pressurization on the laminate section. Therefore, a curved surface resin structure that is prevented from damages such as cracks in the conductive layer of the laminate section can be obtained.

The surface displacement means a step or unlevelness at the boundary between the laminate section and a non-laminate section. When the surface displacement is greater, the step is gentler, the maximum portion and the minimum portion of the step are spaced apart by a greater distance, and a strained portion is closer to the center of the laminate section. This may degrade the optical property at the center at which the device is used frequently.

In general, the inside of the laminate section formed of the conductive layer and the electronic material layer is softer than the outside of the laminate section where, for example, a protective seal material is formed. Moreover, a film thickness difference or gap tends to occur at the boundary of the laminate section, due to difference in constituent layers. Because a high heat and a high pressure are applied during curving processing for, for example, optical lenses that need a high curved surface accuracy, the laminate section may be strained and the conductive layer and functional layers may be damaged.

Here, the present disclosure can suppress damages of the conductive layer due to curved surface formation even when the conductive layer used in the laminate section is excellent in transparency and conductivity. The electronic material layer is laminated in a manner to contact the conductive layer, and the electronic material layer of the laminate section undergoes a reaction in response to a voltage or a current applied to one conductive layer or across two conductive layers between which the electronic material layer is sandwiched.

<Conductive Layer>

The conductive layer is not particularly limited and may be appropriately selected depending on the intended purpose so long as the conductive layer has conductivity. For example, the conductive layer may be one that can drive an electronic device in response to a voltage applied, or may be one that can generate heat utilizing Joule heat and function as a heater. The conductive layer may be divided into a plurality of parts. The manner for dividing the conductive layer into a plurality of parts is not particularly limited and may be appropriately selected depending on the intended purpose. The conductive layer may be divided into two parts, or a plurality of thin film transistors (TFT) may be arranged in the conductive layer in a matrix form as in known displays.

It is preferable that the conductive layer contain a conductive material, and more preferably a transparent conductive material.

The conductive material is not particularly limited and may be appropriately selected depending on the intended purpose. Examples of the conductive material include, but are not limited to, conductive materials such as opaque materials and transparent materials. Among these conductive materials, transparent materials are preferable for display applications or light control applications in which visibility is needed.

The opaque materials are not particularly limited and may be appropriately selected depending on the intended purpose. Examples of the opaque materials include, but are not limited to, metal materials such as Au, Ag, Cu, Al, Ni, W, and Mo.

Examples of the transparent materials include, but are not limited to, inorganic oxides, carbon (CNT, graphene), metal nanowire, metal grid, and conductive polymers. Among these transparent materials, inorganic oxides are preferable because inorganic oxides have conductivity in the form of dense films, and are excellent in conductivity, transparency (transmittance and haze), and reliability.

The inorganic oxides are not particularly limited and may be appropriately selected depending on the intended purpose. Examples of the inorganic oxides include, but are not limited to, oxide materials of, for example, In, Sn, Zn, and Al. Examples of additive materials to be added in the conductive layer containing the inorganic oxide include, but are not limited to, W, Ti, Zr, Zn, Sb, Ga, Ge, and F.

It is preferable that the conductive layer containing the inorganic oxide contain indium oxide. When the conductive layer contains indium oxide, a transparent conductive layer that is controlled in crystallinity and does not tend to undergo damages such as cracking during heating processing can be obtained.

The conductive layer containing the indium oxide may contain any other oxide of one or a mixture of, for example, tin (Sn), tungsten (W), titanium (Ti), zirconium (Zr), zinc (Zn), aluminum (Al), antimony (Sb), gallium (Ga), and fluorine (F). When any other oxide is contained, indium oxide has an improved carrier density and an improved mobility, and the crystallization temperature of indium oxide can be changed. In this case, it is preferable that the conductive layer contain tin-doped indium oxide (hereinafter, referred to as "ITO").

The content of the any other oxide in the conductive layer is not particularly limited, may be appropriately selected depending on the intended purpose, and is preferably 80% by mass or less. Tin oxide and zirconium oxide are preferable as the any other oxide particularly in terms of conductivity, and the content of tin oxide and zirconium oxide in the conductive layer is particularly preferably, for example, 15% by mass or less.

The transparent conductive material may be a composite layer including a layer containing, for example, carbon having an excellent stretchability such as carbon nanotube (CNT) and graphene, metal nanowire, metal grid, or a conductive polymer, and a layer containing an inorganic oxide.

The average thickness of the conductive layer is not particularly limited, may be appropriately selected depending on the intended purpose, and is preferably, for example, 50 nm or greater but 500 nm or less, and more preferably 200 nm or less. When the average thickness of the conductive layer is 50 nm or greater but 500 nm or less, the conductive layer can be suppressed from damages such as cracks during curved surface formation processing. It is preferable to adjust the average thickness of the conductive layer to suit to the amount of a current needed in an electronic device.

The sheet resistance of the conductive layer is not particularly limited, may be appropriately selected depending on the intended purpose, and is preferably 300 Ω/sq. or lower.

The transmittance of visible light through the conductive layer is not particularly limited, may be appropriately selected depending on the intended purpose, and is preferably 70% or higher. It is possible to appropriately adjust the transmittance by changing the average thickness of the conductive layer, and the oxygen ration in the inorganic oxide such as indium oxide.

The conductive layer can be formed by, for example, a vacuum film formation method. The crystallinity, i.e., the crystal peak shape (height H/width W value), of the indium oxide layer can be adjusted based on, for example, the substrate temperature, the film formation rate, and the gas pressure during the vacuum film formation. Heating processing after the film formation is also effective for adjustment of the H/W value. Examples of the vacuum film formation method include, but are not limited to, a vacuum vapor deposition method, a sputtering method, an ion-plating method, and a chemical vapor deposition (CVD) method. Among these methods, a sputtering method that can form a film at a high rate is preferable. The sputtering method can easily control the H/W value of the crystal peak by adjusting the sputtering power.

In the conductive layer used in the present disclosure, the H/W value of the crystal peak shape on the (222) face of indium oxide is preferably 6 or less. The measurement conditions include a Cu tube as a radiation source, 50 kV, 1,000 micrometers, an incident angle of 3 degrees, a slit width of 1 mm, and a collimator diameter of 1 mm. This is because cracks tend to occur from the crystal surface if the crystallinity is extremely high.

The method for forming the conductive layer is not particularly limited and may be appropriately selected depending on the intended purpose. Examples of the method include, but are not limited to, a method of producing an ink containing, for example, conductive particles, carbon nanotube (CNT), graphene, or a conductive polymer, and coating the ink, to form a film.

The method for coating the conductive layer is not particularly limited and may be appropriately selected depending on the intended purpose. Examples of the method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, and various printing methods such as a gravure printing method, a screen printing method, a flexographic printing method, an offset printing method, a reverse printing method, and an inkjet printing method.

<Electronic Material Layer>

It is preferable that the electronic material layer be laminated on the conductive layer within the plane of the support. It is more preferable that the electronic material layer be laminated being sandwiched between two conductive layers. The electronic material layer of the laminate section undergoes a reaction in response to a voltage or a current applied to the conductive layer.

The electronic material layer is not particularly limited and may be appropriately selected depending on the intended purpose so long as the electronic material layer exerts functions such as color development, light emission, polarization, deformation, and heat generation in response to an electric power (voltage or current) applied.

It is preferable that the electronic material layer contain an electronic material, and more preferably an inorganic material.

Examples of the electronic material include, but are not limited to, electrochromic materials, electroluminescence materials, chemical luminescence materials, electrophoretic materials, electrowetting materials, liquid crystal materials, piezoelectric materials, electricity storage materials, electrolytes, electrothermal conversion materials, and solar cell materials. Among these electronic materials, electrochromic materials are preferable. That is, it is preferable that the electronic material layer include an electrochromic layer. It is preferable that the electronic material layer include an electrolyte layer and an electrochromic layer.

It is preferable that the electrolyte layer include a solid electrolyte layer containing an ionic liquid or a polymer, or both, because such an electrolyte layer has an excellent processability during bending processing and heating processing. Hence, the curved surface resin structure of the present disclosure can be used as, for example, light control eyeglasses (light control sunglasses).

The inorganic material is contained in the electronic material layer in order to impart strength and thickness uniformity to the electronic material layer and suppress thermal expansion of the electronic material layer.

The inorganic material is not particularly limited and may be appropriately selected depending on the intended purpose. Examples of the inorganic material include, but are not limited to, inorganic nanoparticles. The electronic material layer may be formed of inorganic nanoparticles.

The average thickness of the electronic material layer is not particularly limited, may be appropriately selected depending on the intended purpose, and is preferably 100 micrometers or less in terms of material costs and processability.

The electronic material layer is preferably a layer formed of an organic material having an excellent flexibility having durability against processing and molding.

The method for coating the electronic material layer is not particularly limited and may be appropriately selected depending on the intended purpose. Examples of the method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, and various printing methods such as a gravure printing method, a screen printing method, a flexographic printing method, an offset printing method, a reverse printing method, and an inkjet printing method.

<<Electrochromic Layer>>

The electrochromic layer contains an electrochromic material and further contains other components as needed.

The electrochromic material is not particularly limited and may be appropriately selected depending on the intended purpose so long as the electrochromic material exhibits electrochromism. Examples of the electrochromic material include, but are not limited to, inorganic electrochromic compounds, organic electrochromic compounds, and conductive polymers.

The inorganic electrochromic compound is not particularly limited and may be appropriately selected depending on the intended purpose. Examples of the inorganic electrochromic compound include, but are not limited to, tungsten oxide, molybdenum oxide, iridium oxide, and titanium oxide. The inorganic electrochromic compound is used in the form of a film as, for example, a particle layer of, for example, nanoparticles, and a dense layer.

The organic electrochromic compound is not particularly limited and may be appropriately selected depending on the intended purpose. Examples of the electrochromic compound that is polymer-based or pigment-based include, but are not limited to, azobenzene-based, anthraquinone-based, diarylethene-based, dihydroprene-based, dipyridine-based, styryl-based, styryl spiropyran-based, spirooxazine-based, spirothiopyran-based, thioindigo-based, tetrathiafulvalene-based, terephthalic acid-based, triphenylmethane-based, benzidine-based, triphenylamine-based, naphthopyran-based, viologen-based, pyrazoline-based, phenazine-based, phenylene diamine-based, phenoxazine-based, phenothiazine-based, phthalocyanine-based, fluoran-based, fulgide-based, benzopyran-based, and metallocene-based low-molecular-weight organic electrochromic compounds; and conductive polymeric compounds such as polyaniline and polythiophene. One of these electrochromic compounds may be used alone or two or more of these electrochromic compounds may be used in combination. A monomer containing a reactive group may be polymerized and used.

It is preferable that the electrochromic layer have a structure in which conductive or semi-conductive particles support an organic electrochromic compound. Specifically, in a preferable structure, particles having a particle diameter of about from 5 nm through 50 nm are bound to a surface of an electrode, and an organic electrochromic compound containing a polar group such as a phosphonic acid, a carboxyl group, and a silanol group is adsorbed to the surface of the particles. Compared with existing electrochromic devices, this structure has an improved responsiveness because this structure enables efficient injection of electrons into the organic electrochromic compound utilizing the large surface effect of the particles. Moreover, use of particles enables formation of a transparent film as a display layer, which can thus exhibit a high color developing density of the electrochromic compound. Moreover, the conductive or semi-conductive particles may support a plurality of kinds of organic electrochromic compounds in the electrochromic layer. Furthermore, the conductive particles may double-function as the conductivity of an electrode layer.

The electrochromic layer includes two electrochromic sections. It is preferable that one electrochromic section be a first electrochromic section containing an electrochromic material that can develop a color in an oxidized state, and that the other electrochromic section be a second electrochromic section containing an electrochromic material that can develop a color in a reduced state. The details of this formation will be described below.

The average thickness of the electrochromic layer is not particularly limited, may be appropriately selected depending on the intended purpose, and is preferably 0.2 micrometers or greater but 5.0 micrometers or less. When the average thickness of the electrochromic layer is 0.2 micrometers or greater, the color developing density can be improved. When the average thickness of the electrochromic layer is 5.0 micrometers or less, production costs can be saved, and transparency in a decolorized state can be increased and visibility can be improved as a result.

It is preferable to form the electrochromic layer by dissolving an electrochromic material in a solvent, coating the resultant to form a film, and subsequently heating and solidifying the film, or by polymerizing the film by light or heat. Examples of the coating method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, and various printing methods such as a gravure printing method, a screen printing method, a flexographic printing method, an offset printing method, a reverse printing method, and an inkjet printing method.

<<<Electrolyte Layer>>>

The electrolyte layer is preferably a solid electrolyte layer that contains an ionic liquid or a polymer, or both, and that is used for an electronic material layer that undergoes an electrochemical reaction such as an electrochromic reaction. Examples of such an electrochemical element include, but are not limited to, electrochromic elements, primary batteries, secondary batteries, capacitors, and solar cells.

It is preferable that the electrochromic layer of the curved surface resin structure of the present disclosure include two electrochromic sections as described above. In this case, it is preferable that the electrochromic layer include electrochromic sections and a solid electrolyte section and include a solid electrolyte section between the two electrochromic sections.

Here, an electrochromic section means a section containing an electrochromic material. A solid electrolyte section means a section formed of a solid electrolyte.

It is preferable to form the solid electrolyte section as a film in which a photocurable or thermosetting resin supports an electrolyte. Moreover, it is preferable to mix inorganic particles that control the layer thickness of the electrolyte section.

It is preferable to form the solid electrolyte section in the form of a film obtained by coating an electrochromic section with a solution in which a curable resin and electrolyte inorganic particles, and, as needed, inorganic particles are mixed, and subsequently curing the solution with light or heat. However, it is also possible to form the solid electrolyte section in the form of a film obtained by previously forming a porous inorganic particle layer, subsequently coating the inorganic particle layer with a solution in which a curable resin and an electrolyte are mixed in a manner that the solution permeates the inorganic particle layer, and subsequently curing the solution with light or heat.

When the electrochromic section is a layer in which conductive or semi-conductive nanoparticles support an electrochromic compound, it is also possible to form the solid electrolyte section in the form of a film obtained by coating the electrochromic section with a solution in which a curable resin and an electrolyte are mixed in a manner that the solution permeates the electrochromic section, and subsequently curing the solution with light or heat.

As the electrolyte in the solid electrolyte section, for example, liquid electrolytes such as ionic liquids, and solutions obtained by dissolving solid electrolytes in solvents are used. An electrochromic material may be mixed in the solid electrolyte section.

The average thickness of the solid electrolyte section is not particularly limited, may be appropriately selected depending on the intended purpose, and is preferably 5 micrometers or greater but 500 micrometers or less, and more preferably 10 micrometers or greater but 100 micrometers or less. When the average thickness of the solid electrolyte section is in the preferable range described above, it is possible to prevent short circuiting of a current and save the production costs.

<Support>

The support contains a resin, and further contains other materials as needed.

The resin material is not particularly limited and may be appropriately selected depending on the intended purpose. For example, a known thermoplastic resin may be used.

Examples of the thermoplastic resin include, but are not limited to, polycarbonate, polyethylene terephthalate, polyethylene naphthalate, acrylic (polymethyl methacrylate), polyvinyl chloride, polyvinylidene chloride, polyvinyl alcohol, polystyrene, styrene acrylonitrile copolymers, styrene butadiene acrylonitrile copolymers, polyethylene, ethylene-vinyl acetate copolymers, polypropylene, polyacetal, cellulose acetate, polyamide (nylon), polyurethane, and fluorine-based resins (TEFLON (registered trademark)).

In terms of moldability, it is preferable that the support be formed of any of materials containing at least one selected from the group consisting of polycarbonate, polyethylene terephthalate, polybutylene terephthalate, polymethyl methacrylate, polyethylene, polypropylene, acrylonitrile-butadiene-styrene (PBS), polyoxymethylene, polyolefin, and urethane, and copolymer materials of these materials. These materials are suitable as injection molding materials described below. Therefore, these materials have an excellent weldability with a resin constituting a resin layer. Among these materials, polycarbonate or polyethylene terephthalate is more preferable.

When expressing a relationship between resins, resins that are classified into the same category may be referred to as resins of "the same kind". Examples of the categories of the resins include, but are not limited to, polycarbonate, polyester, acrylic resins, polyethylene, polypropylene, PBS, polyacetal, polyolefin, and urethane resin.

The softening temperature of the resin of the support is preferably, for example, 80 degrees C. or higher but 300 degrees C. or lower, and more preferably 100 degrees C. or higher but 200 degrees C. or lower.

The transmittance of visible light through the support is preferably 70% or higher.

When providing a curved surface resin structure with a plurality of supports and using the curved surface resin structure for an application in which the curved surface resin structure is viewed from one side, for example, the transmittance of visible light through one support may be 70% or higher and the other support may be opaque.

The average thickness of the support is not particularly limited, may be appropriately selected depending on the intended purpose, and is preferably, for example, 0.03 mm or greater but 5.0 mm or less, in terms of ease with formation of a curved surface.

In molding processing, or with a view to plate thickening, a resin layer is integrated on the surface of the support by bonding or welding.

The interface between the surface of the support and the resin layer can be welded or bonded by various methods such as injection molding, ultrasonic welding, laser welding, thermal welding, vibration welding, and cast molding. Among these methods, injection molding or cast molding that molds products integrally is preferable in terms of productivity. Specifically, a resin support within a plane of which a laminate including at least a conductive layer and an electronic material layer is formed is set in molding dies as an insert sheet, and a resin is injection- or cast insertion-molded, to form a resin layer. It is preferable to produce a curved surface resin structure in this way.

In cast molding, an insert sheet is set in molding dies, and a curable resin is then injected into the molding dies and molded integrally with the insert sheet by curing by heating or curing with light.

The shape of the resin layer is not particularly limited and may be appropriately selected depending on the intended purpose. Examples of the shape of the resin layer include, but are not limited to, planar parts, parts having curved surface shapes, and optical lenses. Among these shapes, optical lenses are preferable. When the resin layer is an optical lens, the curved surface resin structure of the present disclosure can be used as a lens of an eyeglass-shaped wearable device. In this case, it is particularly preferable that the curved surface resin structure include an electrochromic layer as the electronic material layer, because the curved surface resin structure of the present disclosure can be used as a lens of light control eyeglasses (light control sunglasses).

The resin of the resin layer is not particularly limited and may be appropriately selected depending on the intended purpose. The resin is preferably a resin of the same kind as the resin material of the support. Resins of "the same kind" are as described in the description of the support. When both are of the same kind, it is possible to improve the welding strength between the support and the resin layer, and make the support and the resin layer uniform in refractive index and improve transparency (visibility) of the curved surface resin structure. Moreover, like the material of the support, at least one selected from the group consisting of polycarbonate and polycarbonate copolymers is more preferable for the resin layer in terms of moldability, transparency, and costs.

As the polycarbonate copolymer materials, various copolymer materials containing different kinds of monomer components have been developed in terms of improving the refractive index of polycarbonate, reducing birefringence, and imparting flame retardancy. For example, commercially-available polycarbonates, polycarbonate copolymers, UV-curable resins, and thermosetting resins may be used.

Examples of the polycarbonates include, but are not limited to, IUPILON CLS3400S (available from Mitsubishi Engineering Plastics Corporation), IUPILON H-4000 (available from Mitsubishi Engineering Plastics Corporation), AD5503 (available from Teijin Limited), L-1225LM (available from Teijin Limited), and TR-0601A (available from Sumika Polycarbonate Limited, SD).

Examples of the polycarbonate copolymers include, but are not limited to, SH1126Z (available from Teijin Limited), IUPILON KH3310UR (available from Mitsubishi Engineering Plastics Corporation), SP5570 (available from Teijin Limited), SP5580 (available from Teijin Limited), and SP1516 (available from Teijin Limited).

Examples of the UV-curable resins include, but are not limited to, SK6500 and SK3200 (available from Dexerials Corporation).

Examples of the thermosetting resins include, but are not limited to, MR8, MR7, and MR10 (available from Mitsui Chemicals, Inc.).

As the properties of the resin layer, it is preferable that the resin layer have a high fluidity when contacting the support during production. For example, it is preferable that injection molding resins be high in melt volume flow rate according to ISO 1133. Specifically, the melt volume flow rate of resin layer materials according to ISO 1133 is preferably 14 $cm^3$/10 min or higher. In injection molding, the higher the fluidity of the resin to be injected, the more it is possible to reduce damage on the insert sheet (particularly, a conductive layer) due to shearing stress. Hence, when the melt volume flow rate of the resin layer material is 14 $cm^3$/10 min or higher, it is possible to suppress damages such as cracks in the conductive layer.

Examples of the instrument for measuring the melt volume flow rate of a resin according to ISO 1133 include, but are not limited to, a melt indexer F-F01 (available from Toyo Seiki Seisaku-sho, Ltd.), and a melt indexer D4003 (available from Dynisco Japan Ltd.). The melt volume flow rate of polycarbonate is typically measured at a measurement temperature of 300 degrees C. and a measurement load of 1.20 kgf.

When it is hard to obtain a welding strength between the support and the resin layer during welding or bonding, it is possible to provide an adhesive layer between the support and the resin layer.

<Seal Member>

It is preferable that the curved surface resin structure of the present disclosure further include a seal member.

The seal member is not particularly limited and may be appropriately selected depending on the intended purpose.

The seal member is formed in a manner to physically and chemically protect the circumference of the laminate section of the curved surface resin structure, and the surfaces and side surfaces of the structure. Particularly, when forming a curved surface resin structure by pasting two supports, it is preferable to provide a seal member outside circumferential ends of the laminate section formed between the two supports.

The seal member is not particularly limited and may be appropriately selected depending on the intended purpose. Examples of the seal member include, but are not limited to, photocurable resins, thermosetting resins, and materials obtained by adding inorganic particles to these resins.

By adding the inorganic particles, it is possible to control the film thickness of the seal layer and reduce the coefficient of thermal expansion and water permeability.

It is preferable that the seal member have an insulating property.

It is possible to form the seal member by, for example, applying a photo-curable or thermosetting insulating resin in a manner that at least any of the circumference of the laminate section of the curved surface resin structure, and the side surfaces and the top surface of the curved surface resin structure is coated with the resin, and then cuing the resin.

The method for coating the seal member is not particularly limited and may be appropriately selected depending on the intended purpose. Examples of the coating method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, and various printing methods such as a gravure printing method, a screen printing method, a flexographic printing method, an offset printing method, a reverse printing method, and an inkjet printing method.

The average thickness of the seal member is preferably greater than or equal to the thickness of the laminate section in terms of protecting the laminate section. When the seal member is formed on the surface and side surfaces of the laminate section of the curved surface resin structure, the average thickness of the seal member is not particularly limited, may be appropriately selected depending on the intended purpose, and is preferably 0.5 micrometers or greater but 100 micrometers or less.

The content of the inorganic particles is not particularly limited, may be appropriately selected depending on the intended purpose, and is preferably 10 wt % or greater but 200 wt % or less relative to the seal member. When the content of the inorganic particles is 10 wt % or greater, it is easy to control the film thickness and possible to reduce the coefficient of thermal expansion and water permeability. When the content of the inorganic particles is 200 wt % or less, the seal layer has a high denseness and an improved functionality as a barrier layer that suppresses physical or chemical damages.

<Foundation Layer>

The foundation layer is formed between the support and the conductive layer, in order to physically and chemically protect the support and suppress thermal expansion of the surface on which the conductive layer is to be formed during heating processing. By forming a layer that undergoes a less thermal expansion than the support as the foundation layer, it is possible to suppress thermal deformation of the surface on which the conductive layer is to be formed during heating processing, and suppress the conductive layer from being cracked and damaged even when the conductive layer is formed of a material having a high Young's modulus, such as an inorganic oxide.

As the material of the foundation layer, it is preferable to use a resin layer containing inorganic particles.

The coefficient of thermal expansion of a resin layer containing inorganic particles can be smaller than a common resin foundation layer formed of a resin alone.

The softening temperature of the resin contained in the foundation layer is preferably 100 degrees C. or higher and more preferably higher than the softening temperature of the resin constituting the support. Use of a material having a high softening temperature as the resin to be contained in the foundation layer makes it possible to suppress thermal expansion of the surface on which the conductive layer is to be formed (i.e., the surface to contact the conductive layer) during heating, and to suppress the conductive layer from being cracked and damaged.

The resin contained in the foundation layer is not particularly limited and may be appropriately selected depending on the intended purpose. Examples of the resin include, but are not limited to, ultraviolet (UV)-curable resin materials and thermosetting resin materials. Examples of the resin include, but are not limited to, acrylic resins, epoxy resins, urethane resins, silicone resins, and melamine resins. These materials are preferable in terms of moldability, transparency, and costs.

As the resin contained in the foundation layer, a cured product of an oligomer having a plurality of unit structures with respect to a reactive group is preferable. When the resin contained in the foundation layer is a monomer having a single unit structure with respect to a reactive group, a cured product of the monomer constituting the foundation layer may be cracked during heating processing. It is preferable that the resin contained in the foundation layer be an oligomer having a plurality of unit structures with respect to a reactive group, because a cured product of the oligomer has a higher flexibility than a cured product of a monomer and is less likely to be cracked.

—Inorganic Particles—

The inorganic particles in the foundation layer are not particularly limited and may be appropriately selected depending on the intended purpose. For example, an inorganic filler commonly used may be used. More specific examples of the inorganic particles include, but are not limited to, silicon oxides, zirconia oxides, aluminum oxides, tin oxides, various kinds of mica, Ag, Cu, Au, and Ni. One of these kinds of inorganic particles may be used alone or two or more of these kinds of inorganic particles may be used in combination.

The number average particle diameter of the primary particle diameter of the inorganic particles is not particularly limited, may be appropriately selected depending on the intended purpose, and is preferably, for example, 1 nm or greater but 50 micrometers or less, and more preferably 1 nm or greater but 100 nm or less. When the number average particle diameter of the primary particle diameter of the inorganic particles is 1 nm or greater but 50 micrometers or less, transparency of the foundation layer can be secured.

The content of the inorganic particles in the foundation layer is not particularly limited, may be appropriately selected depending on the properties of the foundation layer (e.g., transparency, film thickness, and coefficient of thermal expansion), and is preferably 10% by mass or greater and more preferably 10% by mass or greater but 200% by mass or less relative to the total amount of the resin. When the content of the inorganic particles in the foundation layer is 10% by mass or greater relative to the total amount of the resin, the effect of suppressing thermal expansion can be improved. It is preferable that the content of the inorganic particles in the foundation layer be 10% by mass or greater but 200% by mass or less, because a smooth foundation layer can be obtained.

The thickness of the foundation layer is not particularly limited, may be appropriately selected depending on the intended purpose, and is preferably, for example, 0.1 micrometers or greater but 50 micrometers or less.

The transmittance of visible light through the foundation layer is preferably 70% or higher.

It is possible to adjust the softening temperature and the coefficient of thermal expansion of the foundation layer by changing, for example, the kind of the resin and the kind of the inorganic material used in the foundation layer, the contents of these materials, the crosslinking density, and the amount of the reaction initiator.

The softening temperature of the resin can be measured by, for example, a thermo-mechanical analysis (TMA), a dynamic mechanical analysis (DMA), or differential scanning calorimetry (DSC).

The method for forming the foundation layer is not particularly limited and may be appropriately selected depending on the intended purpose. For example, it is possible to form the foundation layer by coating the support with a mixture of a mixture material containing at least an organic monomer material containing a reactive group and an initiator, with an inorganic material, and solidifying or curing the mixture by, for example, UV irradiation, thermal treatment, or dehydration treatment.

Examples of the coating method include, but are not limited to, a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, and various printing methods such as a gravure printing method, a screen printing method, a flexographic printing method, an offset printing method, a reverse printing method, and an inkjet printing method.

<Other Members>

The other members are not particularly limited and may be appropriately selected depending on the intended purpose. For example, it is possible to form a conductive section to be coupled to a power supply, and an antireflection layer or a polarization layer for adjusting optical transmittance.

(Method for Producing Curved Surface Resin Structure)

A method for producing a curved surface resin structure of the present disclosure includes placing a resin structure as an insert sheet, which includes a laminate section produced by forming at least a conductive layer and an electronic material layer in this order within a plane of a resin support, in molding dies, and integrally molding a resin layer on the back surface of the insert sheet by insertion molding. In order to improve the easiness with which the resin structure is placed in the molding dies and reduce elongation or contraction of the support during insertion molding, it is preferable to compression-bond the surface of the support on a curved surface molding die that is heated and temperature-controlled before insertion molding, to plastically deform the surface of the support and form a curved surface shape.

The method may further include other steps as needed.

The method for producing a curved surface resin structure of the present disclosure can be suitably performed by a producing apparatus (insertion injection molding apparatus) described below.

During insertion injection molding, it is preferable to inject a melted resin in a direction approximately parallel with the surface of the support (insert sheet) and integrally form a resin layer on the support. This makes it possible to improve the surface accuracy of the front and back surfaces of the molding, and improve the fluidity and filling speed of the resin discharged and suppress damages on the conductive layer, the electronic material layer, and the support due to shearing stress of the resin injected.

As the shape of the resin injection port (gate) of the molding die, a shape that is narrow in the direction of the thickness of the curved surface resin structure so as not to face the side surface of the insert sheet is preferable. This is because the fluidity and filling speed of the resin to be injected are better as the gate shape is more broadened in the thickness and width directions, but the insert sheet is more likely to be broken by the shearing stress when the gate shape is more broadened in the thickness direction.

It is preferable that the thickness of the resin injection port shape of the molding die be less than or equal to the average thickness of the curved surface resin structure, and that the width of the shape of the resin injection port of the molding die be greater than the thickness of the shape of the resin injection port. This makes it possible to obtain the curved surface resin structure of the present disclosure.

In the method for producing the curved surface resin structure of the present disclosure, it is preferable that the melt volume flow rate of the resin to be injected according to ISO 1133 be 14 $cm^3$/10 min or higher. In injection molding, the higher the fluidity of the resin to be injected, the more it is possible to reduce damage on particularly the conductive layer of the insert sheet (support) due to shearing stress. Hence, when the melt volume flow rate of the resin is 14 $cm^3$/10 min or higher, it is possible to suppress damages such as cracks in the conductive layer.

Particularly, when the curved surface resin structure to be molded has a small thickness, the insert sheet is more susceptible to shearing stress by the resin injected. Hence, for example, when the average thickness of the resin layer is 2 mm or less, it is preferable that the melt volume flow rate be 24 $cm^3$/10 min or higher.

During insertion injection molding, the temperature of the molding dies is preferably lower than the softening temperature of the resin by 10 degrees C. or more, and is more preferably from 30 degrees C. through 150 degrees C.

It is preferable that the temperature of the molding dies be a temperature lower than or equal to the softening temperature of the support. This makes it possible to suppress softening of the support and suppress damages of the conductive layer.

During insertion injection molding, the pressure (dwelling pressure) is preferably 100 MPa or higher but 150 MPa or lower. This makes it possible to pressurize the whole of the laminate section of the curved surface resin structure uniformly, and obtain the curved surface resin structure of the present disclosure.

During injection molding of a polycarbonate resin or a polycarbonate copolymer resin, the temperature of the molding dies is preferably 40 degrees C. or higher but 120 degrees C. or lower, and the pressure (dwelling pressure) is preferably 100 MPa or higher but 150 MPa or lower. By heating and pressurization within these ranges, the laminate section is less likely to be strained for cases where a high curved surface accuracy is needed as in optical lenses, and the conductive layer and the electronic material layer are less likely to be damaged.

The curved surface resin structure of the present disclosure can be used as, for example, a part of an electrochromic device, or an electronic light control lens.

Embodiments of the present disclosure will be described below. The present disclosure should not be construed as being limited to these embodiments.

For example, the number, position, and shape of the constituent members are not limited to the embodiments, and may be any number, position, and shape that are suitable for carrying out the present disclosure.

First Embodiment

Figure 1B:
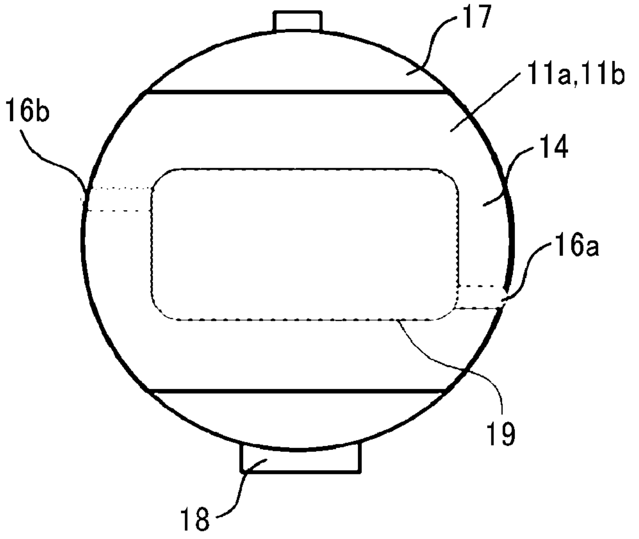
FIG. 1B is a schematic top view of the curved surface resin structure according to the first embodiment.

First, a curved surface resin structure according to the first embodiment will be described. The curved surface resin structure according to the first embodiment is an embodiment relating to an electrophoretic display element. FIG. 1A and FIG. 1B are schematic side views of the first embodiment.

The curved surface resin structure 10 according to the first embodiment includes supports 11*a* and 11*b*, foundation layers 13*a* and 13*b* on the supports 11*a* and 11*b* respectively, a laminate section 19 including a conductive layer 12*a*, an electronic material layer 15, and a conductive layer 12*b* between the foundation layers 13*a* and 13*b*, a seal member 14 on the circumference of the laminate section 19 to cover the outside of the ends of the laminate section, and a resin layer 17 formed on the back surface of the support 11*a*.

In the present embodiment, the electronic material layer 15 is an electrophoretic ink layer containing white and black particles for reverse display.

A part of the conductive layer 12*a* and a part of the conductive layer 12*b* are exposed from the seal member 14 to serve as leads 16*a* and 16*b*. A conductive paste or a metal electrode, or both are formed on the leads.

Figure 2A:
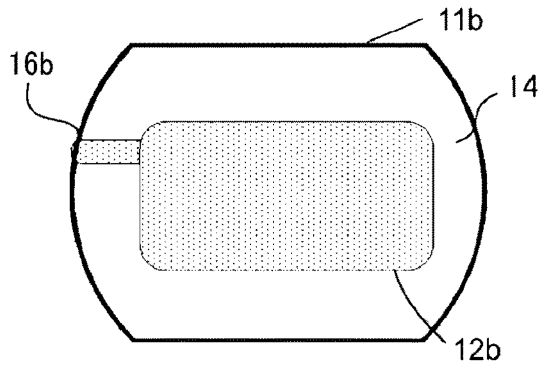
FIG. 2A is a schematic top view of a resin structure (insert sheet) according to the first embodiment.
Figure 2B:
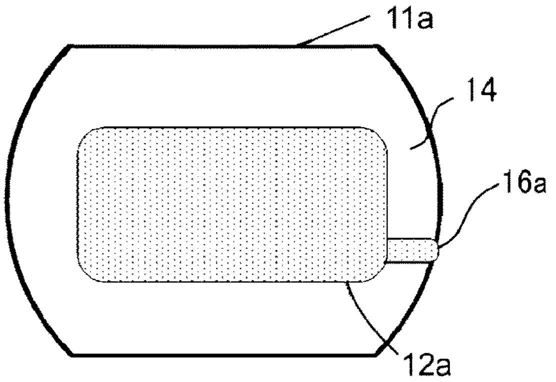
FIG. 2B is a schematic top view of a resin structure (insert sheet) according to the first embodiment.
Figure 2C:
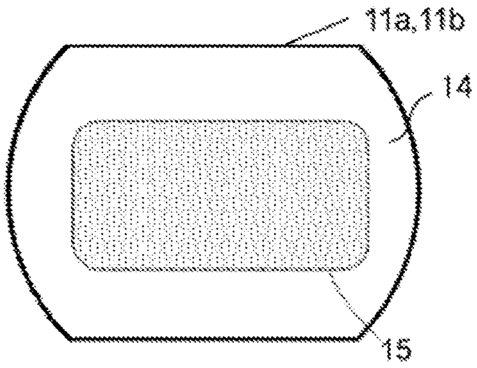
FIG. 2C is a schematic top view of a resin structure (insert sheet) according to the first embodiment.

FIG. 2A to FIG. 2C are schematic top views of a resin structure (insert sheet) according to the first embodiment. The contours of the supports 11*a* and 11*b* are formed of a straight line portion including two straight lines approximately parallel with each other and a curve portion including two arc curves linking both ends of the straight line portion. The foundation layers 13*a* and 13*b* have the same contours. FIG. 2A illustrates an example of the positional relationship between the seal member 14 and the conductive layer 12*b*. FIG. 2B illustrates an example of the positional relationship between the seal member 14 and the conductive layer 12*a*. FIG. 2C illustrates an example of the positional relationship between the seal member 14 and the electronic material layer 15.

The curved surface resin structure 10 illustrated in FIG. 1 is a flat plate sheet-like resin structure formed by, for example, preparing a sheet 1 including the conductive layer 12*a* on the foundation layer 13*a* and a sheet 2 likewise including the conductive layer 12*b* on the foundation layer 13*b*, pasting the sheets with each other in a manner to sandwich the electronic material layer 15 (electrophoretic ink layer) and the seal member 14 between the sheets. For curved surface shape processing, the flat plate sheet-like resin structure, or a curved surface resin structure (insert sheet) previously processed to have a curved surface is set in molding dies, and a resin material for constituting the resin layer 17 is then injection-molded or casting-molded from a gate portion 18 to the back surface (support 11*a* side) of the insert sheet and cured. In this way, an integrally molded curved surface resin structure is produced.

In the curved surface resin structure of the present disclosure, inflection points within the same phase of the surface displacement of the laminate section in the longer direction are present on both sides of the center of the laminate section, and the relationship rA1,rA2<rB, or rA1, rA2>rB is satisfied.

The surface-curved surface displacement at the boundary between the laminate section and a non-laminate section is 0.8 micrometers or greater.

The main component of the electrophoretic ink layer is a layer in which positively charged oxide particles such as titanium oxide and negatively charged organic particles such as carbon are dispersed in a solvent. Through the white and black charged particles being reversed in the ink layer in response to a voltage applied, the electrophoretic ink layer displays a white color or a black color.

Second Embodiment

Figure 3:
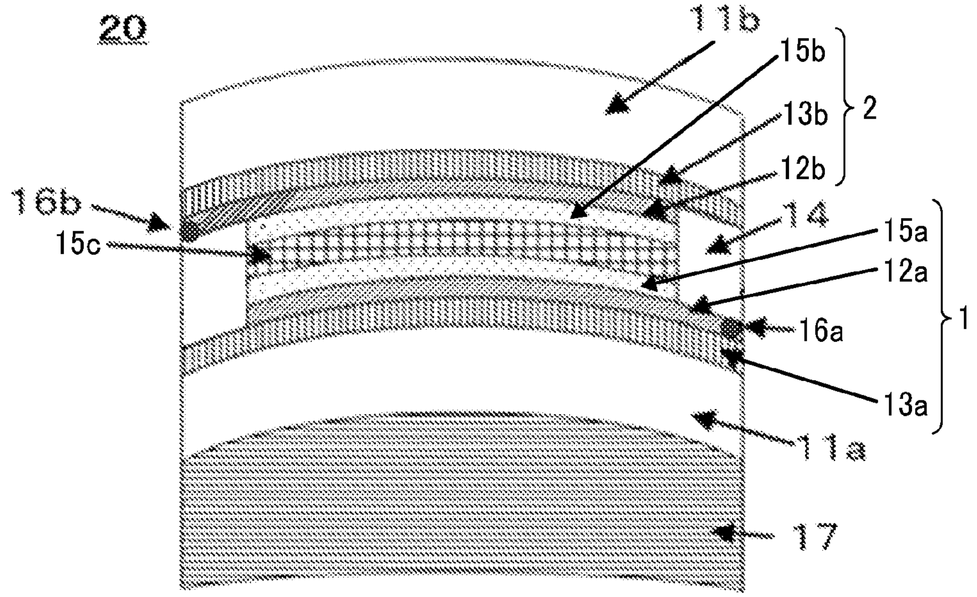
FIG. 3 is a schematic side view of a curved surface resin structure according to a second embodiment.

Next, a curved surface resin structure according to a second embodiment will be described. The curved surface resin structure according to the second embodiment is an embodiment relating to an electrochromic element. FIG. 3 is a schematic side view illustrating an example according to the second embodiment.

The curved surface resin structure 20 according to the second embodiment is different from the curved surface resin structure according to the first embodiment in that the electronic material layer 15 includes a reduction electrochromic (EC) section as an electronic material layer 15*a*, an oxidation EC section as an electronic material layer 15*b*, and a solid electrolyte section as an electronic material layer 15*c*.

The curved surface resin structure 20 illustrated in FIG. 3 is a flat plate sheet-like resin structure formed by, for example, preparing a sheet 1 including a conductive layer 12*a* and a reduction electrochromic (EC) section as the electronic material layer 15*a* on a foundation layer 13*a* and a sheet 2 likewise including a conductive layer 12*b* and an oxidation electrochromic (EC) section as the electronic material layer 15*b* on a foundation layer 13*b*, and pasting the sheets with each other in a manner to sandwich the electronic material layer 15*c* (solid electrolyte section) and a seal member 14 between the sheets.

For insertion molding as welding or bonding processing, the flat plate sheet-like resin structure, or a curved surface resin structure (insert sheet) previously processed to have a curved surface is set in molding dies, and a resin material for constituting a resin layer 17 is then injection-molded or casting-molded from a gate portion 18 to the back surface (support 11*a* side) of the resin structure and cured. In this way, an integrally molded curved surface resin structure is produced.

In the curved surface resin structure of the present disclosure, inflection points within the same phase of the surface displacement of the laminate section in the longer direction are present on both sides of the center of the laminate section, and the relationship rA1,rA2<rB, or rA1, rA2>rB is satisfied.

The surface-curved surface displacement at the boundary between the laminate section and a non-laminate section is 0.8 micrometers or greater.

In applications in which color development and hue changes of the electronic material layers 15*a* and 15*b* are viewed from only one side, which is either the support 11*a* side or the support 11*b* side, the support on the viewer side is transparent but the support on the other side needs not be transparent.

One of the electrochromic layers 15*a* and 15*b* may be replaced with a deterioration preventing layer that does not change hues in response to a voltage or current applied.

The material of the deterioration preventing layer is not particularly limited and may be appropriately selected depending on the intended purpose so long as the material can prevent corrosion of the conductive layer due to irreversible oxidation-reduction reactions.

As the material of the deterioration preventing layer, for example, tin antimony oxide, nickel oxide, titanium oxide, zinc oxide, and tin oxide, or a conductive or semi-conductive metal oxides containing a plurality of kinds of these materials may be used.

Among these materials, it is preferable to use a highly transparent material as the deterioration preventing layer when producing an electrochromic device as an optical element such as a lens that needs to have transparency.

As the highly transparent material, it is preferable to use n-type semiconductor oxide particles (n-type semi-conductive metal oxide). As the n-type semi-conductive metal oxide, titanium oxide, tin oxide, and zinc oxide formed of particles having a primary particle diameter of 100 nm or less, or compound particles or a mixture containing a plurality of kinds of these materials may be used.

On the other hand, examples of the material of a highly transparent p-type semi-conductive layer as the deterioration preventing layer include, but are not limited to, organic materials containing nitroxyl radicals (NO radicals). More specific examples include, but are not limited to, derivatives of 2,2,6,6-tetramethyl piperidine-N-oxyl (TEMPO), or polymer materials of the derivatives.

<Embodiments of the Method for Producing Curved Surface Resin Structure>

For insertion molding as welding processing, an insert sheet is preformed with a view to, for example, improving the processing accuracy, suppressing sheet damages, and improving the processing yield. Here, a curved surface forming method for preforming suitable for the present disclosure will be described.

Figure 4:
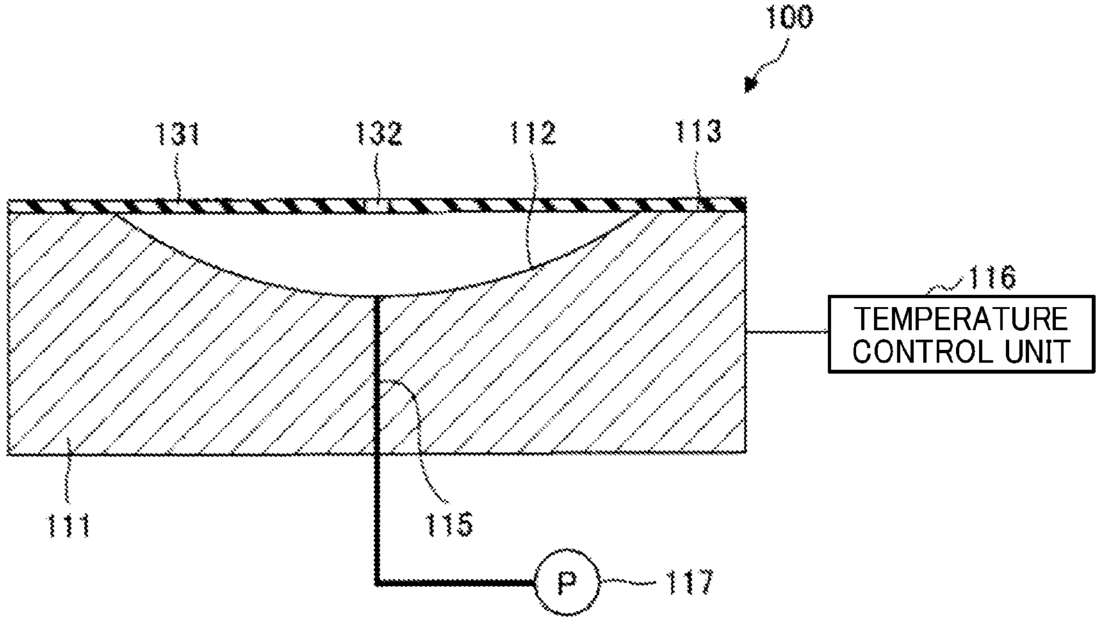
FIG. 4 is a schematic side view of a curved surface forming apparatus according to an embodiment of the present disclosure.
Figure 5A:
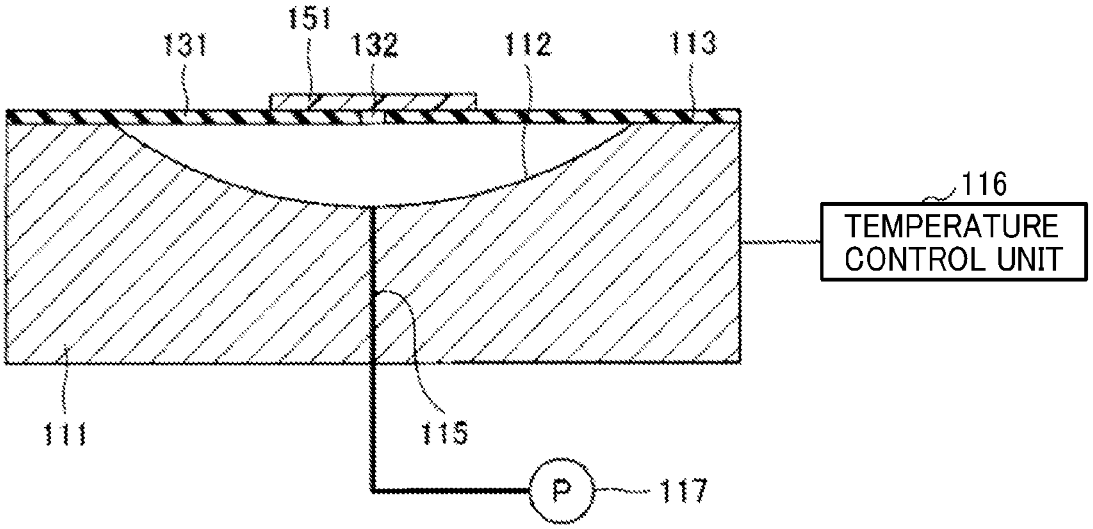
FIG. 5A is a diagram illustrating a method for forming a stereoscopic curved surface using a curved surface forming apparatus according to an embodiment of the present disclosure in order of steps.
Figure 5B:
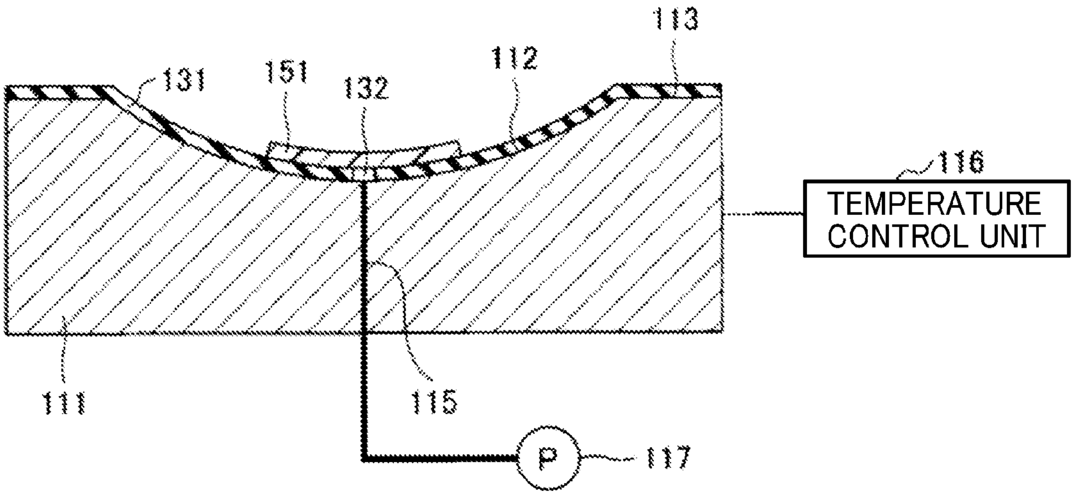
FIG. 5B is a diagram illustrating a method for forming a stereoscopic curved surface using a curved surface forming apparatus according to an embodiment of the present disclosure in order of steps.

FIG. 4 is a schematic side view of a curved surface forming apparatus according to an embodiment of the present disclosure. FIG. 5A and FIG. 5B are diagrams illustrating a method for forming a stereoscopic curved surface using the curved surface forming apparatus according to an embodiment of the present disclosure in order of steps.

As illustrated in FIG. 4, the curved surface forming apparatus 100 includes a concave die 111, and a temperature control unit 116 configured to control the temperature of the concave die 111. The concave die 111 has a hole 115 that links the bottom of a concave surface 112 having a three-dimensional (3D) curved surface shape, e.g., a spherical surface shape, to the back surface. An air intake/exhaust pump 117 is coupled to the hole 115. The curved surface forming apparatus 100 includes an elastic sheet 131 that is disposed on a planar surface 113 around the concave surface 112 of the concave die 111 in a manner to close the concave surface 112. The elastic sheet 131 has a through-hole 132 from the front to the back thereof.

When processing a laminate sheet serving as an insert sheet into a 3D curved surface shape using the curved surface forming apparatus 100, first, an insert sheet 151 is prepared as illustrated in FIG. 5A. The temperature control unit 116 heats and controls the temperature of the concave die 111 to around the softening temperature (Tg) of the support of the insert sheet. The insert sheet 151 is placed on the elastic sheet 131 in a manner to close the hole 132. For example, the temperature control is within the temperature range of from a temperature higher than the softening temperature (Tg) by 20 degrees C. through a temperature lower than the softening temperature (Tg) by 20 degrees C. It is preferable to control the temperature to a temperature lower than the softening temperature.

Next, the air intake/exhaust pump 117 is actuated to evacuate the space between the concave surface 112 and the elastic sheet 131 of air. As a result, the elastic sheet 131 stretches and closely attaches to the concave surface 112. Moreover, the insert sheet 151 closely attaches to the elastic sheet 131 and comes close to the concave die 111 along with deformation of the elastic sheet 131. Therefore, heat is conducted to the insert sheet 151 from the concave die 111, and the support included in the insert sheet 151 is softened. Then, as illustrated in FIG. 5B, the insert sheet 151 closely attaches to the concave die 111 and plastically deforms to conform to the concave surface 112.

Subsequently, the air intake/exhaust pump 117 is stopped from being actuated, and the hole 115 is opened to the air. As a result, the elastic sheet 131 returns to the original shape, and the insert sheet 151 can be released from the concave die 111. Because the support has plastically deformed, the insert sheet 151 permanently maintains the shape conforming to the concave surface 112 even after released from the concave die 111.

In this way, the insert sheet 151 can be processed into a 3D curved surface shape.

According to this processing method, the elastic sheet 131 stretches or constricts isotropically during the processing.

Therefore, the insert sheet 151 is pressurized by the concave die 111 uniformly and closely attaches to the concave die 111. The support included in the insert sheet 151 is not heated and softened previously, but closely attaches to the temperature-controlled concave die 111 and gradually receives heat and softens.

Hence, according to the present processing method, it is possible to deform the conductive layer included in the insert sheet 151 while suppressing strains and cracks in the direction along the curved surface. When the insert sheet also includes an electronic material later on the conductive layer, it is also possible to suppress strains and cracks of the electronic material layer. Even when a mechanical property of the conductive layer is non-uniform in the conductive layer, for example, when the conductive layer is divided or when a plurality of TFT are arranged in a matrix form, it is possible to suppress variation of strains in the electronic material layer and obtain a uniform performance.

Figure 6:
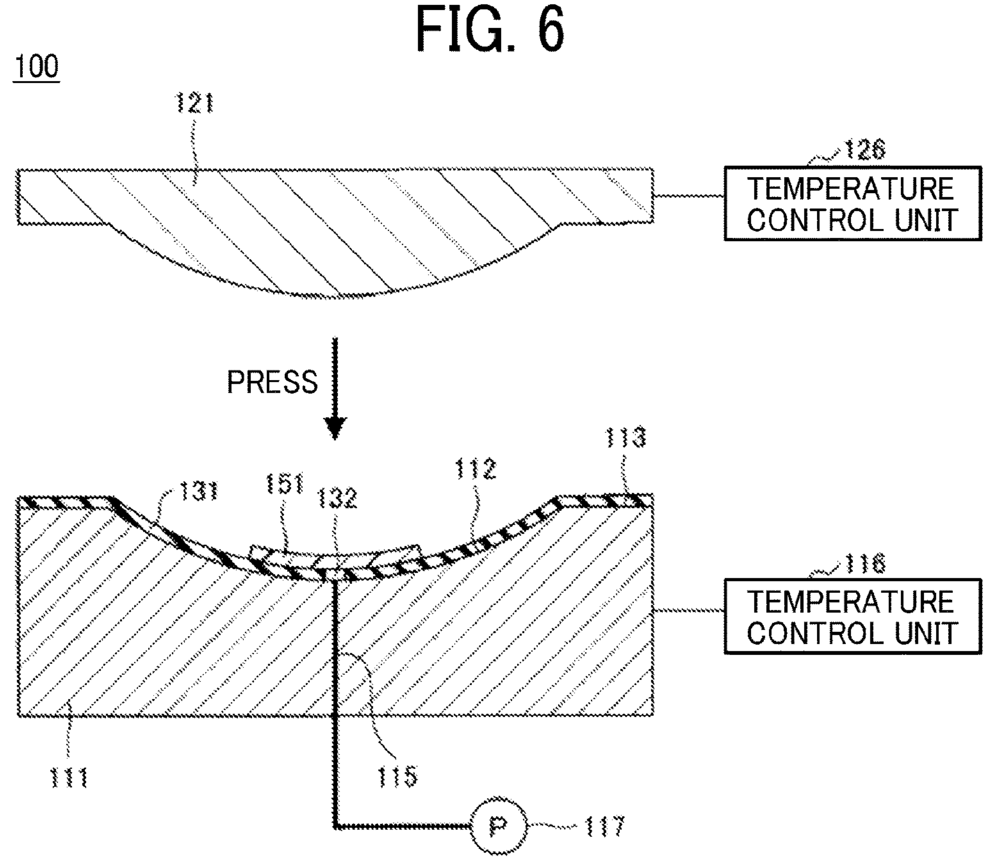
FIG. 6 is a diagram illustrating another method for forming a stereoscopic curved surface using a curved surface forming apparatus according to an embodiment of the present disclosure in order of steps.

FIG. 6 is a diagram illustrating another method for forming a stereoscopic curved surface using the curved surface forming apparatus according to an embodiment of the present disclosure in order of steps.

As illustrated in FIG. 6, the curved surface forming apparatus 100 may include a convex die 121 that can be fitted within the concave die 111, and a temperature control unit 126 configured to control the temperature of the convex die 121. When this curved surface forming apparatus 100 is used, it is possible to better improve the surface accuracy by making the insert sheet 151 closely attach to the concave die 111 and subsequently pressing the insert sheet 151 with the convex die 121 heated and temperature-controlled by the temperature control unit 126.

In the present processing method, it is preferable that the range of the concave surface of the concave die be broader than the processing target insert sheet in a plan view perspective. In this case, it is possible to make the whole of the insert sheet closely attach to the concave surface without restraining the insert sheet, and process the insert sheet into a 3D curved surface shape while better suppressing strains.

The temperatures of the concave die and the convex die are controlled within the range of, for example, from the softening temperature (Tg) of the support through a temperature lower than the softening temperature (Tg) by 20 degrees C. It is preferable to control the temperature of a flat plate-shaped insert sheet before made to closely attach to the concave die to a temperature lower then room temperature or the softening temperature by 20 degrees C. or more.

Here, the members of the curved surface forming apparatus 100 will be described in more detail.

<Elastic Sheet 131>

The elastic sheet 131 has a function of stretching or constricting in response to decompression or pressurization to make an insert sheet closely attach to a molding die. The elastic sheet 131 also has a function of conducting heat of the molding die to the insert sheet.

The material of the elastic sheet is not particularly limited and may be appropriately selected depending on the intended purpose. For example, a known elastic rubber material may be used. Examples of the elastic rubber material include, but are not limited to, natural rubbers, styrene-butadiene rubbers (SBR), isoprene rubbers (IR), butadiene rubbers (BR), chloroprene rubbers (CR), acrylonitrile-butadiene rubbers (NBR), butyl rubbers (isobutylene-isoprene rubbers (IIR)), ethylene-propylene rubbers (EPM), ethylene-propylene-diene rubbers (EPDM), urethane rubbers (U), silicone rubbers (silicone rubbers (Si, Q)), and fluororubbers (FKM).

As the material of the elastic sheet, silicone rubbers and fluororubber are particularly preferable.

As the material of the elastic sheet, for example, styrene-based, olefin-based, ester-based, urethane-based, amide-based, polyvinyl chloride (PVC)-based, and fluorine-based thermoplastic elastomers may also be used. It is preferable to select the material of the elastic sheet depending on the conditions when forming a curved surface on an insert sheet, such as temperature and pressure. For example, it is preferable to select the material considering, for example, heat resistance and elasticity depending on the conditions.

The average thickness of the elastic sheet is not particularly limited, may be appropriately selected depending on the intended purpose, and is preferably 0.01 mm or greater but 2.0 mm or less in terms of facilitating formation of a curved surface.

When the elastic sheet has adhesiveness, the elastic sheet can hold the insert sheet in place without a hole.

In terms of deformation uniformity of an insert sheet, it is preferable that the elastic sheet not stubbornly adhere to an insert sheet and the molding die, but the surfaces of the elastic sheet contacting an insert sheet and the molding die be slippery. Moreover, in order to release the elastic sheet from the molding die and peel an insert sheet from the elastic sheet after a curved surface is formed, it is preferable that, for example, surface treatment for reducing friction be applied to the surface of the elastic sheet.

The hole 132 of the elastic sheet 131 is formed in order to adsorb the insert sheet 151 to the elastic sheet 131 and hold the insert sheet 151 thereon. The number of the hole 132 may be one or a plural number. The position of the hole 132 may be arbitrarily set to suit to the shape of the insert sheet 151.

<Molding Dies 111 and 121>

As the concave die and the convex die, common molding dies may be used so long as the molding dies have curved surfaces matching a 3D curved surface shape to be formed on an insert sheet, e.g., a spherical surface shape, and heat capacity suitable for processing.

The material of the molding dies is not particularly limited and may be appropriately selected depending on the intended purpose. For example, metal materials such as aluminum (Al) and nickel (Ni), and steel materials for molding dies such as NAK80 and STAVAX, glass, and ceramics may be used.

The temperature control unit includes a temperature-controlling heater attached inside the molding die or on the external surface of the molding die. A common heat resisting treatment or releasing treatment, or both may be applied on the surfaces of the molding dies.

It is possible to arbitrarily set the number and position of the hole 115 of the concave die 111 to suit to the shape of the insert sheet 151.

Successively, an insertion injection molding method will be described as an example of the method for producing a curved surface resin structure of the present disclosure.

In the present disclosure, after an insert sheet 151 is set on one surface of an openable-closable molding die and the molding die is closed, a melted resin is injected and filled on the back surface of the support and subsequently cooled and solidified, to form a welded resin section (resin layer).

In the present disclosure, an injection molding apparatus of, for example, an electrically-driven type, a hydraulic type, and a hybrid hydraulic type may be used.

Figure 7:
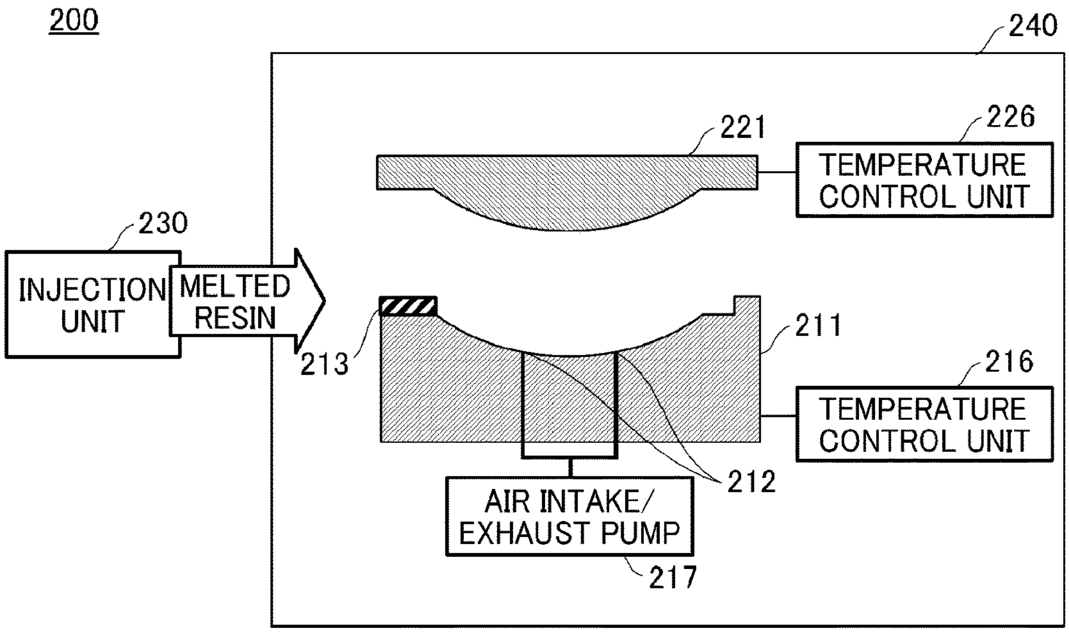
FIG. 7 is a diagram illustrating an insertion injection molding apparatus configured to produce a spherical surface molding, which is an example of a curved surface resin structure of the present disclosure.
Figure 8A:
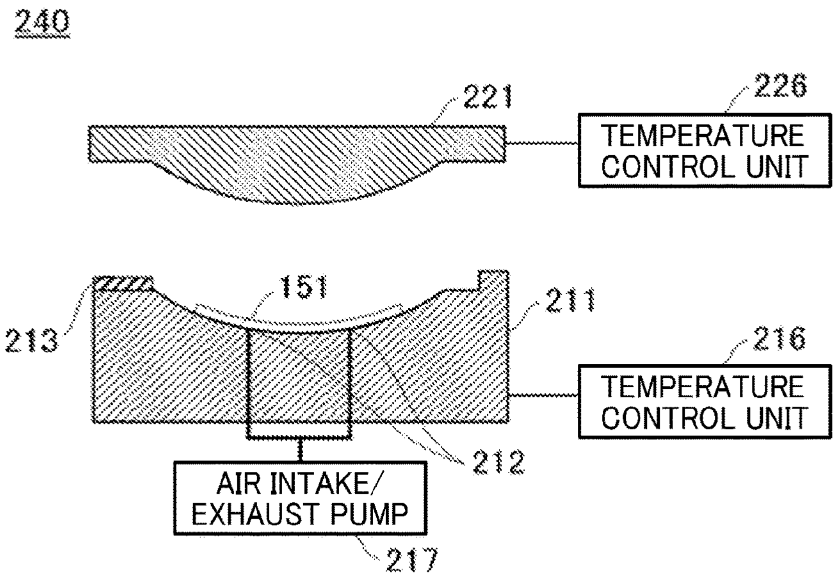
FIG. 8A is a diagram illustrating a method for integrally molding an insert sheet using an insertion injection molding apparatus in order of steps.
Figure 8B:
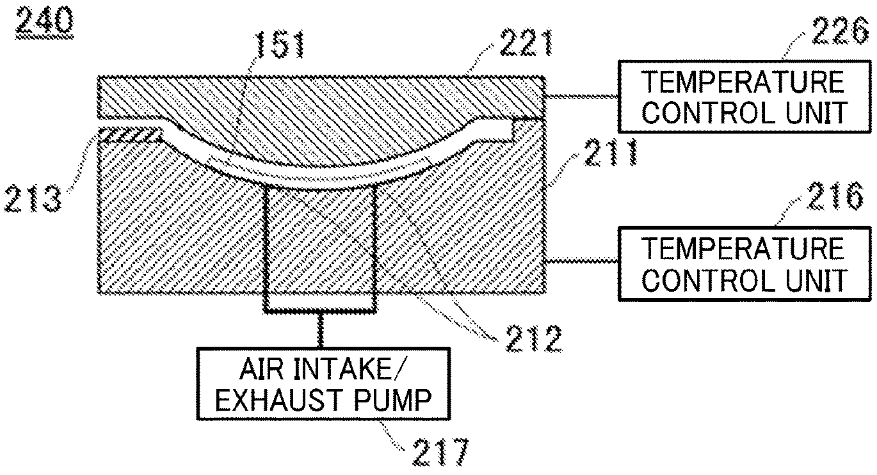
FIG. 8B is a diagram illustrating a method for integrally molding an insert sheet using an insertion injection molding apparatus in order of steps.
Figure 8C:
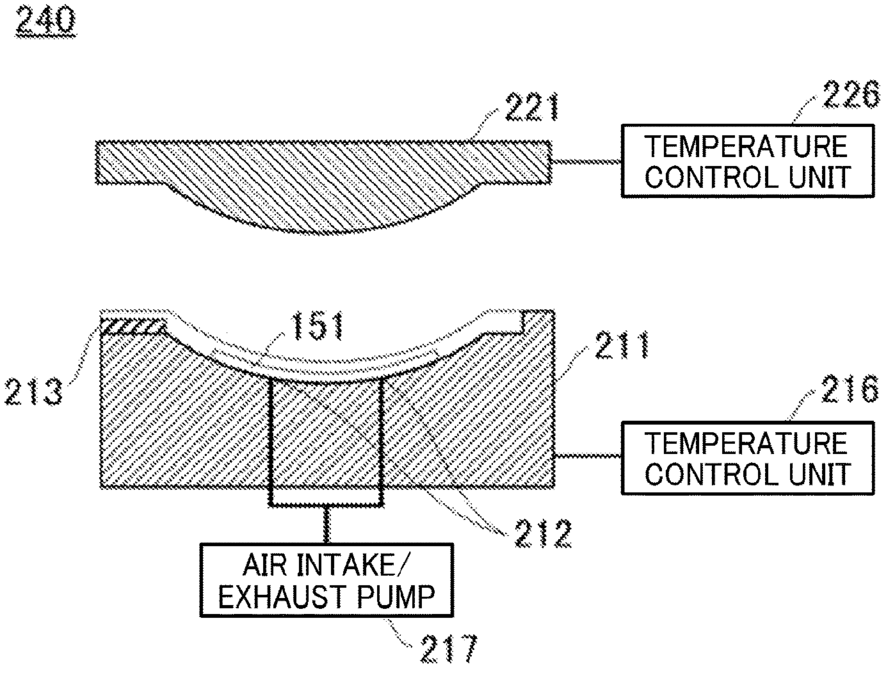
FIG. 8C is a diagram illustrating a method for integrally molding an insert sheet using an insertion injection molding apparatus in order of steps.

FIG. 7 is a diagram illustrating an embodiment of an insertion injection molding apparatus configured to produce a curved surface resin structure, which is an example of the present disclosure. FIG. 8A to FIG. 8C are diagrams illustrating a method for integrally molding an insert sheet using the insertion injection molding apparatus in order of steps.

As illustrated in FIG. 7, the insertion injection molding apparatus 200 includes an injection unit 230 and a mold clamping unit 240. The insertion injection molding apparatus 200 causes the injection unit 230 to inject a heated, melted resin material into the molding dies of the mold clamping unit 240 through, for example, a jetting nozzle, and opens or closes the molding dies, to produce a resin molding (curved surface resin structure).

The mold clamping unit 240 includes a movable die 221 and a fixed die 211, which are temperature-controlled by a temperature control unit 226 and a temperature control unit 216 respectively.

One of the dies has a sheet adsorption hole 212 or a positioning step, or both in order for an insert sheet 151 to be set as needed. The sheet adsorption hole 212 is coupled to an air intake/exhaust pump 217, and adsorbs the insert sheet 151 to itself when securing the insert sheet 151 and jets a gas such as air when releasing the insert sheet 151. The sheet adsorption hole 212 or the positioning step is formed in order to improve the positional accuracy of the insert sheet, and is not indispensable when a high positioning accuracy is not needed.

When integrally molding an insert sheet 151 with a resin (welded resin) for forming a resin layer using the insertion injection molding apparatus 200, first, an insert sheet 151 is prepared as illustrated in FIG. 8A. Further, the temperature control units 216 and 226 heat and control the temperatures of the molding dies to lower than or equal to the softening temperature (Tg) of the welded resin. In this way, the heating condition is controlled.

Then, the insert sheet 151 is set on the molding die 211 in a manner to close the adsorption hole 212, and the air intake/exhaust pump 217 performs air evacuation to secure the insert sheet 151. It is only needed that securing the insert sheet 151 by adsorption be performed until before a welded resin is injected.

It is preferable to preform the insert sheet 151 as described above. However, preforming is not indispensable so long as the insert sheet is secured sufficiently. The insert sheet 151 is set on the fixed die. However, the molding die structure may be changed and the insert sheet 51 may be set on the movable die 221.

Next, as illustrated in FIG. 8B, the movable die 221 is moved to close the molding die, and a melted resin to be welded is injected through a resin injection port 213 from the injection unit 230, to fill the resin.

The resin injection pressure (dwelling pressure) is preferably 100 MPa or higher but 150 MPa or lower when the resin to be injected is a polycarbonate resin or a polycarbonate copolymer that has a softening temperature of 110 degrees C. or higher but 150 degrees C. or lower.

When the injection pressure (dwelling pressure) is 100 MPa or higher, a good curved surface accuracy can be obtained. When the injection pressure (dwelling pressure) is 150 MPa or lower, it is possible to suppress damages of the laminate section (a conductive layer or an electronic material layer) of the insert sheet due to the injection pressure.

Figure 9:
FIG. 9 is a schematic side view of a shape of a curved surface resin structure of the present disclosure using an insertion injection molding apparatus.

After the resin cools and solidifies, the movable die 221 is moved as illustrated in FIG. 8C to open the molding die, and an integrated laminate (curved surface resin structure) illustrated in FIG. 9 is taken out.

In this way, a curved surface resin structure in which the insert sheet 151 and the resin layer (welded resin) are integrally molded can be produced.

As the movable die 221 and the fixed die 211, common dies may be used so long as the dies have heat capacity suitable for processing, depending on the shape of the laminate, such as a planar surface, a curved surface, and a spherical surface.

Specifically, as the material of the dies, for example, metal materials such as aluminum (Al) and nickel (Ni), steel materials for dies such as NAK80 and STAVAX, glass, and ceramics may be used. The temperature control unit includes a temperature-controlling heater attached inside the die or on the external surface of the die. A common heat resisting treatment or releasing treatment, or both may be applied on the surface of the die.

Moreover, the movable die 221 and the fixed die 211 may be mounted with an ejecting mechanism such as a push pin configured for a molding to be taken out from the die.

In the present embodiment, the temperatures of the movable die 221 and the fixed die 211 are lower than the softening temperature of the resin support 11. In this case, it is possible to suppress softening of the support and suppress damages of the conductive layer. The temperatures of the movable die 221 and the fixed die 211 are preferably, for example, 30 degrees C. or higher but 150 degrees C. or lower. When the resin to be injected is a polycarbonate resin or a polycarbonate copolymer having a softening temperature of 110 degrees C. or higher but 150 degrees C. or lower, the temperatures of the dies are preferably 40 degrees C. or higher but 120 degrees C. or lower. When the temperatures of the dies are 30 degrees C. or higher, a good curved surface accuracy can be obtained. When the temperatures of the dies are 150 degrees C. or lower, it is possible to suppress damages of the laminate section (a conductive layer or an electronic material layer) of the insert sheet due to heat.

Moreover, in the present embodiment, as illustrated in FIG. 8A to FIG. 8C, a resin layer is injected in a direction approximately parallel with the surface of the insert sheet onto the exposed back surface of the insert sheet and integrally formed with the back surface. This makes it possible to improve the curved surface accuracy of the back and front of the molding, and improve the fluidity and filling speed of the resin to be discharged. It is also possible to suppress damages of the conductive layer, the electronic material layer, and the support due to the shearing stress of the resin injected.

It is preferable that the melted resin injection port (gate) of the die have a shape that is narrow in the direction of the thickness of the curved surface resin structure so as not to face the side surface of the insert sheet. This is because the fluidity and filling speed of the resin to be injected are better as the gate shape is broader in the thickness and width direction, but the insert sheet is more likely to be broken by the shearing stress when the gate shape is more broadened in the thickness direction.

In the present embodiment, the melt volume flow rate of the resin to be injected according to ISO 1133 is preferably 14 $cm^3$/10 min or higher. In injection molding, the higher the fluidity of the resin to be injected, the more it is possible to reduce damage on the insert sheet 151 due to shearing stress.

EXAMPLES

The present disclosure will be described below by way of Examples. The present disclosure should not be construed as being limited to these Examples.

Example 1

In Example 1, an example of the curved surface resin structure 20 (electronic device substrate) described in the second embodiment was produced. The produced curved surface resin structure was useful as a part of an electrochromic device, and can be used as an electronic light control lens.

In Example 1, polycarbonate sheets (PC2151, obtained from Teijin Limited, with an average thickness of 0.3 mm) were prepared as the supports 11*a* and 11*b*.

As the materials of the foundation layers 13*a* and 13*b*, an inorganic particle propylene glycol monomethyl ether dispersion liquid (PGM-AC4120Y, obtained from Nissan Chemical Corporation, methacrylic surface treatment, with an average particle diameter of from 10 nm through 15 nm, $SiO_2$) was used as inorganic particles, and an acid-modified epoxy acrylate oligomer resin (ZCR6002H, obtained from Nippon Kayaku Co., Ltd.) was used as a resin. The content of the inorganic particles was adjusted to 150% by mass relative to the total amount of the resin. As a photo initiator, OMNIRAD TPO H (obtained from IGM Resins B.V.) was added in an amount of 4% by mass relative to the total amount of the resin. The resultant was diluted with 1 methoxy 2 propanol, to produce a coating liquid. The coating liquid was coated on the supports using a bar coater, dried at 80 degrees C. for 120 seconds, and subsequently cured by UV irradiation, to form foundation layers A having an average thickness of 2 micrometers.

Next, using an ITO target containing $In_2O_3$ (90% by mass) and $SnO_2$ (10% by mass), conductive layers of an inorganic oxide were formed on the foundation layers by a sputtering method. The sputtering power for film formation was set to 6.5 kW. An oxygen/argon flow rate ratio (02 flow rate ratio) was set to 3.6%. The average thickness of the conductive layers was adjusted to 110 nm based on the film formation time. As the sputtering device, SOLARIS obtained from Oerlikon Japan Co., Ltd. was used.

Using a mask, the conductive layer on one of the supports was formed in the region illustrated in FIG. 2A, and the conductive layer on the other of the supports was formed in the region illustrated in FIG. 2B. The average thickness of the conductive layers was measured with αSTEP D-500 obtained from KLA-Tencor Corporation.

Next, in order to form an electronic material layer (oxidation EC layer) 15*b*, using an inkjet apparatus, a solution in which (a) a radical polymerizable compound containing triarylamine represented by Structural formula A below, (b) polyethylene glycol diacrylate, (c) a photopolymerization initiator, and (d) tetrahydrofuran were mixed at a ratio a:b:c:d of 10:5:0.15:85 (mass ratio) was coated in the region illustrated in FIG. 2C on the support on which the conductive layer was formed in the region illustrated in FIG. 2A. The coated solution was cured with UV under a nitrogen atmosphere, to form an oxidation reaction-type electrochromic layer having an average film thickness of 1.5 micrometers.

<<Structural formula A>>

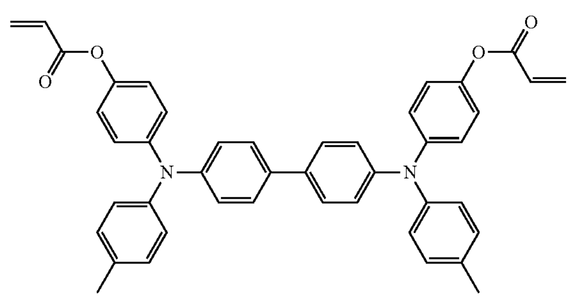

As the polyethylene glycol diacrylate, KAYARAD PEG400DA obtained from Nippon Kayaku Co., Ltd. was used. As the photopolymerization initiator, IRGACURE 184 (obtained from IGM Resins B.V.) was used.

A reduction EC layer 15*a* was formed in the region illustrated in FIG. 2C on the support on which the conductive layer was formed in the region illustrated in FIG. 2B. For formation of the reduction reaction-type electrochromic layer, a solution obtained by adding polyvinyl butyral (1% by mass) in a dispersion liquid of titanium oxide in methanol was coated and annealed at 100 degrees C. for 5 minutes, to form a nanoparticle titanium oxide layer having a thickness of 3 micrometers.

Next, a solution obtained by dissolving a compound represented by Structural formula B below (2% by mass) in 2,2,3,3-tetrafluoropropanol was coated and adsorbed on the surface of the nanoparticle titanium oxide layer and annealed at 100 degrees C. for 5 minutes.

<<Structural formula B>>

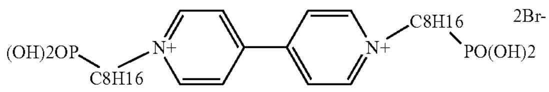

Next, an electrolytic solution in which (a) a $(FSO_2)_2N$-salt of 1-ethyl-3-methyl imidazolium, (b) polyethylene glycol diacrylate, and (c) a photopolymerization initiator were mixed at a ratio a:b:c of 2:1:0.01 (mass ratio) was prepared. The electrolytic solution was filled between the oxidation reaction-type electrochromic layer and the reduction reaction-type electrochromic layer, annealed at 60 degrees C. for 1 minute, and cured by ultraviolet irradiation, to paste the electrochromic layers and produce a pasted body. Here, the filling amount of the electrolytic solution was adjusted in a manner that the average thickness of the solid electrolyte layer 15*c* would be 30 micrometers.

As the polyethylene glycol diacrylate, KAYARAD PEG400DA obtained from Nippon Kayaku Co., Ltd. was used. As the photopolymerization initiator, IRGACURE 184 (obtained from IGM Resins B.V.) was used. Then, a UV-curable acrylic material in which inorganic particles (oxide) were added was filled in the circumferential region of the electronic material layers, and cured with UV, to form a seal member (protective layer). As the inorganic particle-containing UV-curable acrylic material, TB3050B obtained from ThreeBond Co., Ltd. was used.

Subsequently, using the curved surface forming apparatus 100, the pasted EC sheets (referred to as EC sheet 1) were processed into a 3D curved surface shape. In this processing, a spherical concave die having a curvature radius of 131 mm and a diameter of 200 mm was prepared, and a silicone rubber sheet having an average thickness of 0.3 mm was used as the elastic sheet.

As the material of the spherical concave die, a steel material for molding dies, NAK80, was used. The spherical concave mold was temperature-controlled at 140 degrees C. Subsequently, as an insert sheet, the EC sheet 1 was placed on the elastic sheet, and the elastic sheet and the EC sheet 1 were closely attached to the concave mold for 90 seconds by pump suctioning, to plastically deform the EC sheet 1.

Successively, the air intake/exhaust pump was stopped from being actuated, and the hole was opened to the atmosphere, to release the elastic sheet and the EC sheet 1 from the die, to produce the EC sheet 1 on which a spherical 3D curved surface was formed. In this way, the preformed insert sheet 1 was prepared.

Next, using the insertion injection molding apparatus 200, the EC sheet 1 was set in the fixed die. After the old was clamped, a polycarbonate resin was injected, to integrally mold a resin layer and produce a curved surface resin structure (electronic device substrate) 20 having the shape illustrated in FIG. 3 and including an electrochromic laminate section within a plane thereof.

As the injection molding apparatus, SE-D (with a mold clamping pressure of 1,765 kN) C510SHP 32φ (obtained from Sumitomo Heavy Industries, Ltd.) was used. The fixed die and the movable die were produced by mirror-like finishing of a steel material for molding dies, STAVAX, to have a shape having a diameter of 75.5 mm, a curvature radius of 129 mm, and an average thickness of 10 mm. The gate shape was 35 mm (in width direction)×3 mm (in thickness direction) when in convex contact with the concave surface of the molding.

As the resin to be injected (as the resin constituting a resin layer), polycarbonate 1 (L1225, obtained from Teijin Limited, with a softening temperature of 146 degrees C.) was used, and was annealed at 100 degrees C. for 5 hours before injection.

The melt volume flow rate of the resin was 24.0 $cm^3$/10 min (at a measurement temperature of 300 degrees C. and a measurement load of 1.20 kgf).

The injection molding conditions were set as follows. The cooling time was set to 200 seconds.

Die temperatures: 70 degrees C./70 degrees C. (fixed die/movable die)

Resin temperature: 280 degrees C.

Dwelling pressure: 110 MPa, Dwelling pressure application time: 30 seconds

Injection time: 4 seconds

Figure 10B:
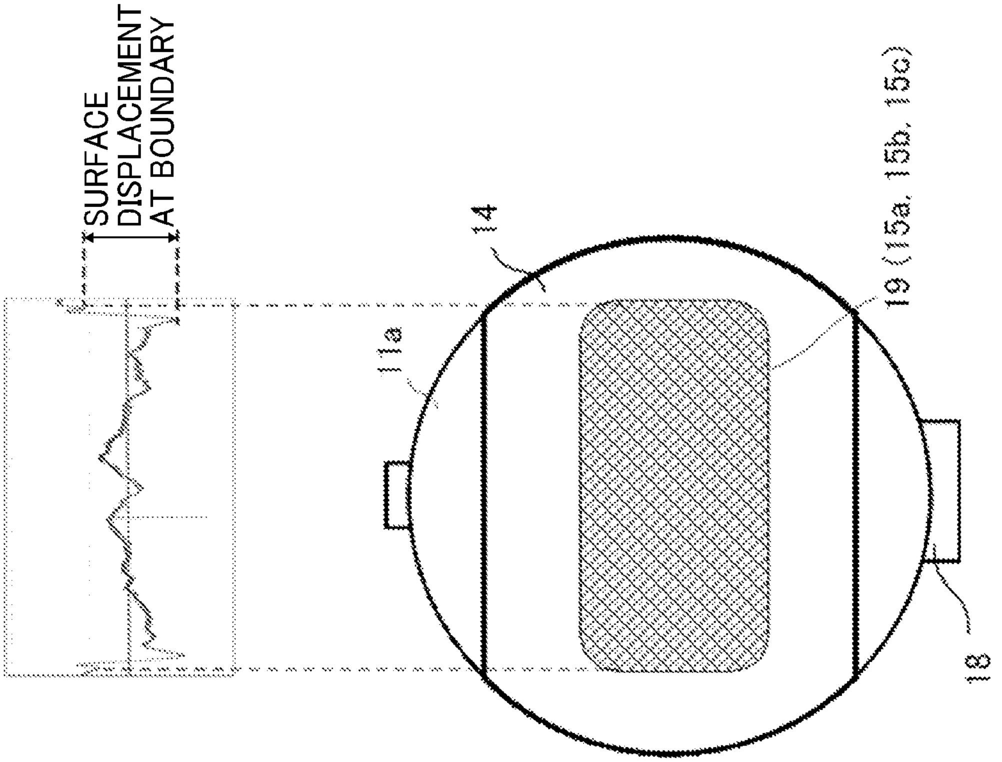
FIG. 10B is a convex curved surface displacement profile (amount of displacement from a curvature radius) of a curved surface resin structure of Example 2.
Figure 10A:
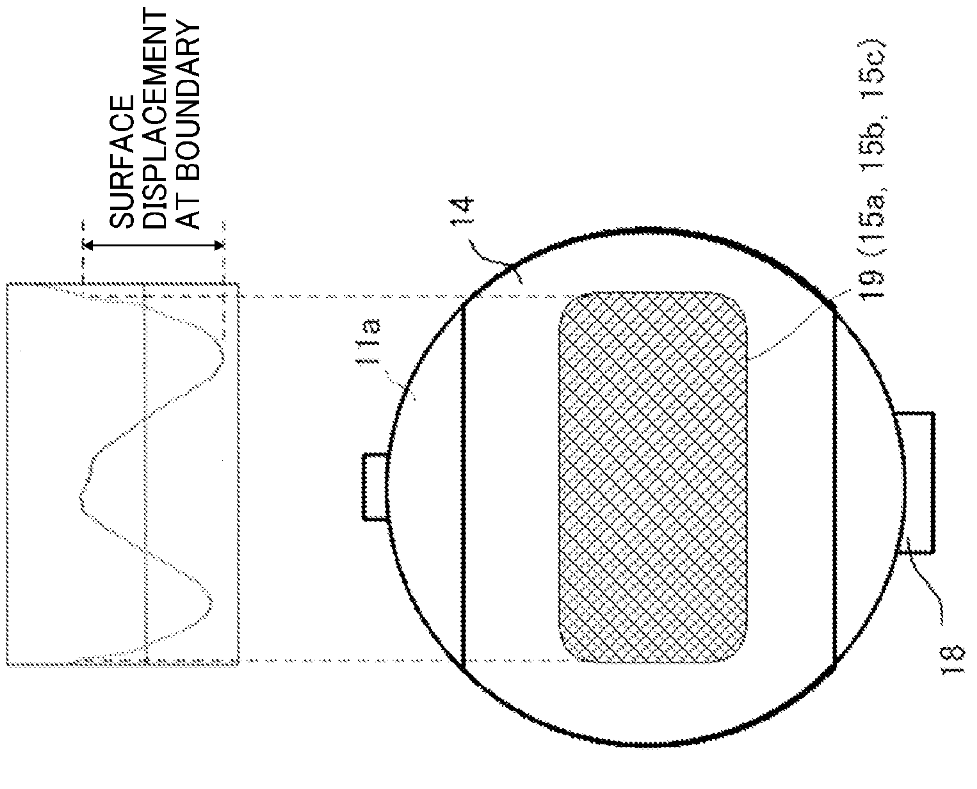
FIG. 10A is a convex curved surface displacement profile (amount of displacement from a curvature radius) of a curved surface resin structure of Example 1.

The convex surface of the laminate section of the produced curved surface resin structure 20 in the longer direction (45 mm) of the laminate section was measured with a surface roughness tester (FORM TALYSURF SERIES 2 obtained from Taylor Hobson, Inc.) to confirm the curvature radius and a surface-curved surface displacement profile (amount of displacement from curvature radius). As a result, the curvature radius was 128.4 mm, and inflection points within the same phase of the surface displacement of the laminate section in the longer direction were present on both sides of the center of the laminate section, and the relationship rA1,rA2<rB was satisfied. The maximum surface-curved surface displacement at the boundary between the laminate section and a non-laminate section was 7.3 micrometers, and the curved surface resin structure 20 was confirmed to be a molding having a small strain of 20 micrometers or less. The surface-curved surface displacement profile of Example 1 is plotted in FIG. 10A.

Six trial products of the curved surface resin structure 20 were produced, and any damage in the laminate section was observed with a surface inspection light (CRLM LED LIGHT CSPV-1000). As a result, the number of moldings from which any damage was observed was zero.

Next, color development/decolorization evaluation of the electronic device substrate 20 was performed. In this evaluation, a voltage of 2.0 V was applied in a manner that the lead of one electronic material layer exposed from the protective layer (seal member) would serve as a positive electrode and the lead of the other electronic material layer exposed from the protective layer would serve as a negative electrode, to inject charges of 7 $mC/cm^2$. As a result, it was confirmed that the oxidation reaction-type electrochromic layer developed a blue-green color and the reduction reaction-type electrochromic layer developed a blue color. Moreover, it was also confirmed that the electrochromic layers decolorized to a transparent state when −0.6 V was applied, and were capable of performing color developing/decolorizing operations properly. The light transmittance was measured with an ultraviolet-visible-near infrared spectrophotometer UH4150 (obtained from Hitachi High-Tech Corporation). The conditions and evaluation results of Example 1 are presented in Tables 1-1 and 1-2.

Example 2

In Example 2, a curved surface resin structure (electronic device substrate) 20 was produced in the same manner as in Example 1, except that the injection molding conditions of Example 1 were changed as below. The curved surface resin structure 20 was evaluated in the same manner as in Example 1. As a result, the same as in Example 1, inflection points within the same phase of the surface displacement of the laminate section in the longer direction were present on both sides of the center of the laminate section, and the relationship rA1,rA2<rB was satisfied. It was confirmed that the maximum surface-curved surface displacement at the boundary between the laminate section and a non-laminate section was 1.2 micrometers and the curved surface resin structure 20 was a molding having a small strain of 20 micrometers or less, there was no damage in the laminate section, and color development/decolorization was good. The surface-curved surface displacement profile of Example 2 is plotted in FIG. 10B. The conditions and evaluation results of Example 2 are presented in Tables 1-1 and 1-2.

Die temperatures: 80 degrees C./80 degrees C. (fixed die/movable die)

Resin temperature: 280 degrees C.

Dwelling pressure: 120 MPa, Dwelling pressure application time: 30 seconds

Injection time: 2 seconds

Example 3

In Example 3, a curved surface resin structure (electronic device substrate) 20 was produced in the same manner as in Example 1, except that the injection molding conditions of Example 1 were changed as below. The curved surface resin structure 20 was evaluated in the same manner as in Example 1. As a result, the same as in Example 1, inflection points within the same phase of the surface displacement of the laminate section in the longer direction were present on both sides of the center of the laminate section, and the relationship rA1,rA2<rB was satisfied. It was confirmed that the maximum surface-curved surface displacement at the boundary between the laminate section and a non-laminate section was 3.7 micrometers and the curved surface resin structure 20 was a molding having a small strain of 20 micrometers or less, there was no damage in the laminate section, and color development/decolorization was good. The conditions and evaluation results of Example 3 are presented in Tables 1-1 and 1-2.

Die temperatures: 40 degrees C./40 degrees C. (fixed die/movable die)

Resin temperature: 280 degrees C.

Dwelling pressure: 150 MPa, Dwelling pressure application time: 30 seconds
Injection time: 2 seconds Example 4

Figure 11:
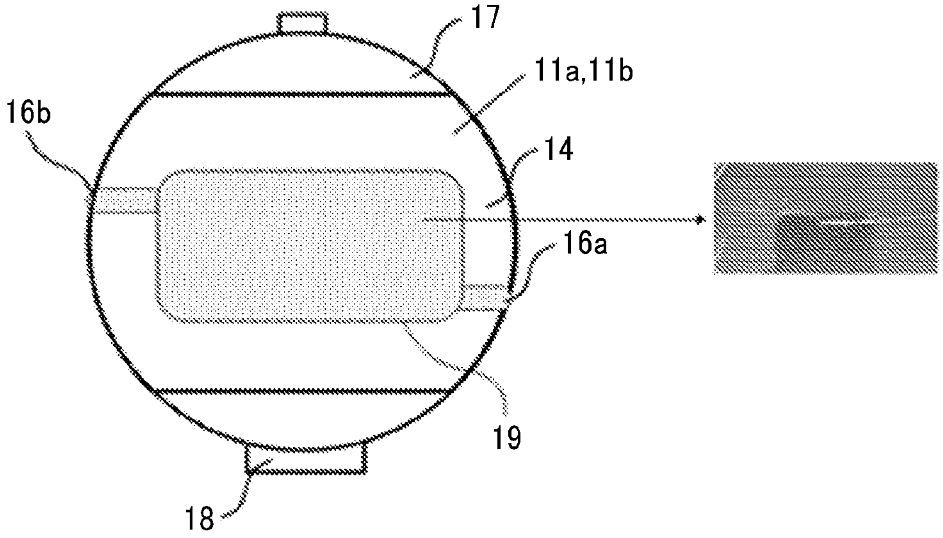
FIG. 11 is a captured image of a crack generated in a laminate section of a curved surface resin structure.

In Example 4, a curved surface resin structure (electronic device substrate) 20 was produced in the same manner as in Example 1, except that the injection molding conditions of Example 1 were changed as below. The curved surface resin structure 20 was evaluated in the same manner as in Example 1. As a result, the same as in Example 1, inflection points within the same phase of the surface displacement of the laminate section in the longer direction were present on both sides of the center of the laminate section, and the relationship rA1,rA2<rB was satisfied. It was confirmed that the maximum surface-curved surface displacement at the boundary between the laminate section and a non-laminate section was 0.9 micrometers and the curved surface resin structure 20 was a molding having a small strain of 20 micrometers or less. However, damages occurred in the laminate sections of two products out of the six products. FIG. 11 illustrates the image of the damage. It was confirmed that the moldings without damages were good at color development/decolorization. The conditions and evaluation results of Example 4 are presented in Tables 1-1 and 1-2.

Die temperatures: 100 degrees C./100 degrees C. (fixed die/movable die)
Resin temperature: 280 degrees C.
Dwelling pressure: 110 MPa, Dwelling pressure application time: 30 seconds
Injection time: 2 seconds Example 5

In Example 5, a curved surface resin structure (electronic device substrate) 20 was produced in the same manner as in Example 1, except that unlike in Example 1, the molding die curvature radius of the curved surface forming apparatus was changed to 87 mm, the curvature radius and the thickness of the fixed die and the movable die of the injection molding apparatus were changed to 87 mm and 10 mm respectively, and polycarbonate 2 (SH1126Z, obtained from Teijin Limited, with a softening temperature of 131 degrees C.) was used as the resin to be injected (as the resin constituting a resin layer) and was annealed at 100 degrees C. for 5 hours before injection.

The melt volume flow rate of the resin was 26.0 $cm^3$/10 min (at a measurement temperature of 300 degrees C. and a measurement load of 1.20 kgf).

Figure 10D:
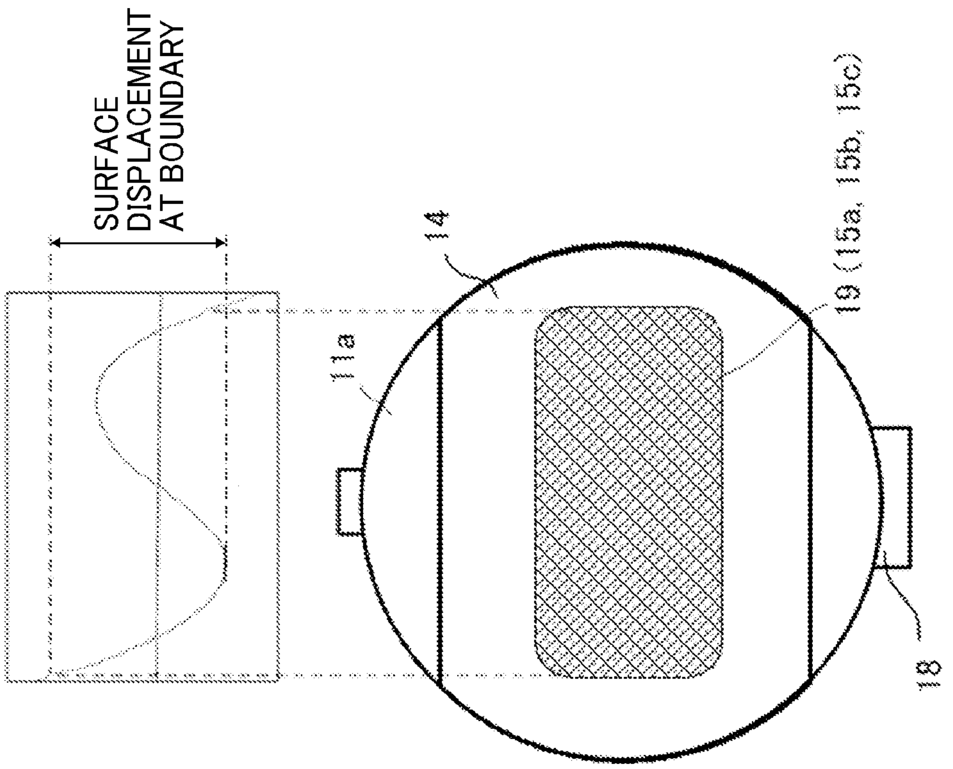
FIG. 10D is a convex curved surface displacement profile (amount of displacement from a curvature radius) of a curved surface resin structure of Comparative Example 1.
Figure 10C:
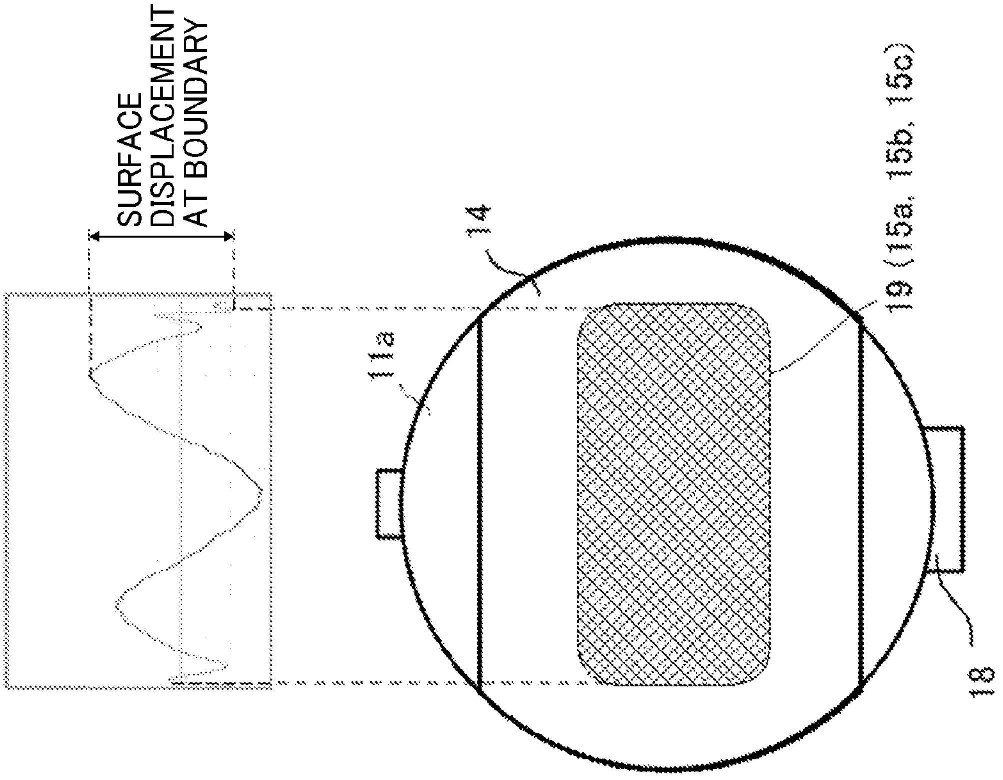
FIG. 10C is a convex curved surface displacement profile (amount of displacement from a curvature radius) of a curved surface resin structure of Example 5.

The curved surface resin structure 20 was evaluated in the same manner as in Example 4. As a result, the same as in Example 1, inflection points within the same phase of the surface displacement of the laminate section in the longer direction were present on both sides of the center of the laminate section, and the relationship rA1,rA2>rB was satisfied. It was confirmed that the maximum surface-curved surface displacement at the boundary between the laminate section and a non-laminate section was 3 micrometers, the maximum surface displacement of the laminate section was 3.5 micrometers, and the curved surface resin structure 20 was a molding having a small strain of 20 micrometers or less. However, damages occurred in the laminate sections of two products out of six products. The damage condition was the same as in Example 4. It was confirmed that the moldings without damages were good at color development/decolorization. The surface-curved surface displacement profile of Example 5 is plotted in FIG. 10C. The conditions and evaluation results of Example 5 are presented in Tables 1-1 and 1-2.

Die temperatures: 60 degrees C./60 degrees C. (fixed die/movable die)
Resin temperature: 270 degrees C.
Dwelling pressure: 140 MPa, Dwelling pressure application time: 30 seconds
Injection time: 1.3 seconds Example 6

In Example 6, a curved surface resin structure (electronic device substrate) 20 was produced in the same manner as in Example 4, except that NF-2000 (obtained from Mitsubishi Engineering Plastics Corporation, with an average thickness of 0.3 mm) was prepared as the polycarbonate sheet of Example 4, conductive layers of an inorganic oxide were formed on the foundation layers by a sputtering method using an ITO target containing $In_2O_3$ (99% by mass) and $ZrO_2$ (1% by mass) at a sputtering power of 6.5 kW and an oxygen/argon (Ar) flow rate ratio of 2.5% during film formation, and the average thickness of the conductive layers was adjusted to 110 nm based on the film formation time. The curved surface resin structure 20 was evaluated in the same manner as in Example 1. As a result, inflection points within the same phase of the surface displacement of the laminate section in the longer direction were present on both sides of the center of the laminate section, and the relationship rA1,rA2<rB was satisfied. It was confirmed that the maximum surface-curved surface displacement at the boundary between the laminate section and a non-laminate section was 1.5 micrometers and the curved surface resin structure 20 was a molding having a small strain of 20 micrometers or less, there was no damage in the laminate section, and color development/decolorization was good. The conditions and evaluation results of Example 6 are presented in Tables 1-1 and 1-2.

Die temperatures: 100 degrees C./100 degrees C. (fixed die/movable die)
Resin temperature: 280 degrees C.
Dwelling pressure: 110 MPa, Dwelling pressure application time: 30 seconds
Injection time: 2 seconds Example 7

In Example 7, a curved surface resin structure (electronic device substrate) 20 was produced in the same manner as in Example 1, except that NF-2000 (obtained from Mitsubishi Engineering Plastics Corporation, with an average thickness of 0.3 mm) was used instead of the polycarbonate sheets of Example 1, and the injection molding conditions were changed as below. The curved surface resin structure 20 was evaluated in the same manner as in Example 1. As a result, inflection points within the same phase of the surface displacement of the laminate section in the longer direction were present on both sides of the center of the laminate section, and the relationship rA1,rA2<rB was satisfied. It was confirmed that the maximum surface-curved surface displacement at the boundary between the laminate section and a non-laminate section was 0.8 micrometers, and the curved surface resin structure 20 was a molding having a small strain of 20 micrometers or less. However, damages occurred in the laminate sections of four products out of six products. The damage condition was the same as in Example 4. It was confirmed that the moldings without damages were good at color development/decolorization. The conditions and evaluation results of Example 7 are presented in Tables 1-1 and 1-2.

Die temperatures: 120 degrees C./120 degrees C. (fixed die/movable die)

Resin temperature: 280 degrees C.

Dwelling pressure: 130 MPa, Dwelling pressure application time: 30 seconds

Injection time: 2 seconds

Comparative Example 1

In Comparative Example 1, a curved surface resin structure (electronic device substrate) 20 was produced in the same manner as in Example 1, except that unlike in Example 1, preforming using the curved surface forming apparatus 100 was not performed, and the injection molding conditions were changed as below. The curved surface resin structure 20 was evaluated in the same manner as in Example 1. As a result, the obtained shape was an asymmetric shape in which inflection points within the same phase of the surface displacement of the laminate section in the longer direction were not present on both sides of the center of the laminate section. A strain greater than 20 micrometers was observed. It was confirmed that there was no damage in the laminate section, and color development/decolorization was good. The surface-curved surface displacement profile of Comparative Example 1 is plotted in FIG. 10D. The conditions and evaluation results of Comparative Example 1 are presented in Tables 1-1 and 1-2.

Die temperatures: 100 degrees C./100 degrees C. (fixed die/movable die)

Resin temperature: 280 degrees C.

Dwelling pressure: 90 MPa, Dwelling pressure application time: 30 seconds

Injection time: 2 seconds

Comparative Example 2

In Comparative Example 2, a curved surface resin structure (electronic device substrate) 20 was produced in the same manner as in Example 1, except that the injection molding conditions of Example 1 were changed as below. The curved surface resin structure 20 was evaluated in the same manner as in Example 1. As a result, no clear inflection points were observed in the surface-curved surface displacement of the laminate section. It was confirmed that the maximum surface-curved surface displacement at the boundary between the laminate section and a non-laminate section was 0.5 micrometers, and the curved surface resin structure 20 was a molding having a small strain of 10 micrometers or less. Damages occurred in the laminate sections of six products out of six products. The damage condition was the same as in Example 4. The conditions and evaluation results of Comparative Example 2 are presented in Tables 1-1 and 1-2.

Die temperatures: 110 degrees C./110 degrees C. (fixed die/movable die)

Resin temperature: 280 degrees C.

Dwelling pressure: 160 MPa, Dwelling pressure application time: 30 seconds

Injection time: 2 seconds

The evaluation criteria for "presence or absence of crack" in Table 1-2 are described below.

"A": No crack occurred in the laminate section and the conductive layers of six products out of six products.

"B": No crack occurred in the laminate section and the conductive layers of four products out of six products.

"C": No crack occurred in the laminate section and the conductive layers of two products out of six products.

"D": A crack occurred in the laminate section and the conductive layers of six products out of six products.

The evaluation criteria for "color development/decolorization drive" in Table 1-2 are described below.

"B": The whole of the electrochromic layers developed colors and decolorized.

"D": No color was developed at a cracked region.

TABLE 1-1

| | | | Injection molding conditions | | | |
|---|---|---|---|---|---|---|
| | Support | Conductive layers | Preforming | Curvature radius of dies (mm) | Die temperatures fixed/movable (degree C.) | Dwelling pressure (Mpa) |
| Ex. 1 | PC2151 | $In_2O_3$: 90%, $SnO_2$: 10% (ITO) | Present | 129 | 70/70 | 110 |
| Ex. 2 | PC2151 | ITO | Present | 129 | 80/80 | 120 |
| Ex. 3 | PC2151 | ITO | Present | 129 | 40/40 | 150 |
| Ex. 4 | PC2151 | ITO | Present | 129 | 100/100 | 110 |
| Ex. 5 | PC2151 | ITO | Present | 87 | 60/60 | 140 |
| Ex. 6 | NF2000 | $In_2O_3$: 99%, $ZrO_2$: 1% (ITO) | Present | 129 | 100/100 | 110 |
| Ex. 7 | NF2000 | $In_2O_3$: 90%, $SnO_2$: 10% (ITO) | Present | 129 | 120/120 | 130 |
| Comp. Ex. 1 | PC2151 | ITO | Absent | 129 | 100/100 | 90 |
| Comp. Ex. 2 | PC2151 | ITO | Present | 129 | 110/110 | 160 |

TABLE 1-2

| | Surface profile | | Evaluation | | |
|---|---|---|---|---|---|
| | Concave inflection points within same phase of surface displacement | Curvature radius (mm) | Surface displacement at boundary (micrometer) | Presence or absence of crack | Color development/ decolorization drive |
| Ex. 1 | Present on both sides of center | 128.4 | 7.3 | A | B |
| Ex. 2 | Present on both sides of center | 128.6 | 1.2 | A | B |
| Ex. 3 | Present on both sides of center | 128.7 | 3.7 | A | B |
| Ex. 4 | Present on both sides of center | 128.6 | 0.9 | B | B |
| Ex. 5 | Present on both sides of center | 87 | 3 | B | B |
| Ex. 6 | Present on both sides of center | 127.6 | 1.5 | A | B |
| Ex. 7 | Present on both sides of center | 128.2 | 0.8 | C | B |
| Comp. Ex. 1 | Not present on both sides of center | 130.5 | 24 | A | B |
| Comp. Ex. 2 | No clear inflection points | 128.1 | 0.5 | D | D |

Aspects of the present disclosure are, for example, as follows.

<1> A curved surface resin structure, including:

a support; and a laminate section within a plane of the support, at least a conductive layer and an electronic material layer being laminated in the laminate section, wherein a surface curvature radius rA1 (mm) of one end of the laminate section, a surface curvature radius rA2 (mm) of another end of the laminate section facing the one end with a center region of the laminate section present at a middle point, and an average curvature radius rB (mm) of a surface of the laminate section satisfy Inequality (1) below or Inequality (2) below:

$$rA1,rA2<rB \quad \text{Inequality (1);}$$

$$rA1,rA2>rB \quad \text{Inequality (2).}$$

<2> A curved surface resin structure, including:

a support; and a laminate section within a plane of the support, at least a conductive layer and an electronic material layer being laminated in the laminate section, wherein vertical surface displacement at a boundary between the laminate section and an end portion of the support where the laminate section is not formed is 0.8 micrometers or greater.

<3> The curved surface resin structure according to <1> or <2>, wherein the electronic material layer includes an electrolyte layer.

<4> The curved surface resin structure according to <3>, wherein the electrolyte layer is a solid electrolyte layer containing an ionic liquid or a polymer, or both.

<5> The curved surface resin structure according to <3> or <4>, wherein the electronic material layer contains an electrochromic material.

<6> The curved surface resin structure according to any one of <1> to <5>, further including a foundation layer between the support and the conductive layer.

<7> The curved surface resin structure according to <6>, wherein the foundation layer contains an epoxy resin.

<8> An electronic light control lens, including the curved surface resin structure according to any one of <1> to <7>.

<9> A method for producing the curved surface resin structure according to any one of <1> to <7>, the method including:

placing the support including the laminate section within the plane of the support, in which at least the conductive layer and the electronic material layer is laminated, in a molding die in a manner to contact the molding die; and performing insertion injection formation of injecting a resin onto an exposed side of the support to form a resin layer integrally with the support.

<10> The method according to <9>, further including before the performing insertion injection formation, compression-bonding the support including the laminate section within the plane of the support, in which at least the conductive layer and the electronic material layer is laminated, onto a curved surface molding die that is heated, to plastically deform the support and form the support having a curved surface shape.

<11> The method according to <9> or <10>, wherein in the performing insertion injection formation, a thickness of a shape of a resin injection port of the molding die is less than or equal to an average thickness of the curved surface resin structure according to any one of <1> to <7>, and a width of the shape of the resin injection port is greater than the thickness.

<12> The method according to any one of <9> to <11>, wherein in the performing insertion injection formation, the resin is injected onto the exposed side of the support to form the resin layer integrally with the support under conditions that a temperature of the molding die is set to a temperature lower than a softening temperature of the resin by 10 degrees C. or more and a dwelling pressure is set to 100 MPa or higher but 150 MPa or lower.

<13> The method according to any one of <9> to <12>, wherein the resin is a polycarbonate resin, and a temperature of the molding die is 40 degrees C. or higher but 120 degrees C. or lower.

The curved surface resin structure according to any one of <1> to <7>, the electronic light control lens according to <8>, and the method for producing a curved surface resin structure according to any one of <9> to <13> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application Nos. 2021-048695 and 2022-037088, filed on Mar. 23, 2021 and Mar. 10, 2022, respectively, in the Japan Patent Office, the entire disclosure of each of which is hereby incorporated by reference herein.

REFERENCE SIGNS LIST

1: sheet having oxidation electrochromic (EC) section
2: sheet having reduction electrochromic (EC) section
10, 20: curved surface resin structure
11*a*, 11*b*: support
12*a*, 12*b*: conductive layer
13*a*, 13*b*: foundation layer
14: seal member
15: electronic material layer
15*a*: electrochromic layer (electrochromic section)
15*b* electrochromic layer (electrochromic section)
15*c* solid electrolyte layer (solid electrolyte section)
16*a*, 16*b*: lead
17 resin layer
18 gate portion
19 laminate section
100: curved surface forming apparatus
200: insertion injection molding apparatus
211: fixed die
213: resin injection port
221: movable die
230: injection unit

The invention claimed is:

1. A curved surface resin structure, comprising:
a support; and
a laminate section within a plane of the support, at least a conductive layer and an electronic material layer being laminated in the laminate section,
wherein a surface curvature radius rA1 (mm) of one end of the laminate section, a surface curvature radius rA2 (mm) of another end of the laminate section facing the one end with a center region of the laminate section present at a middle point, and an average curvature radius rB (mm) of a surface of the laminate section satisfy Inequality (1) below or Inequality (2) below:

$$rA1,rA2<rB \quad \text{Inequality (1);}$$

$$rA1,rA2>rB \quad \text{Inequality (2).}$$

2. The curved surface resin structure according to claim 1, wherein the electronic material layer includes an electrolyte layer.

3. The curved surface resin structure according to claim 2, wherein the electrolyte layer is a solid electrolyte layer containing an ionic liquid or a polymer, or both.

4. The curved surface resin structure according to claim 2, wherein the electronic material layer contains an electrochromic material.

5. The curved surface resin structure according to claim 1, further comprising a foundation layer between the support and the conductive layer.

6. The curved surface resin structure according to claim 5, wherein the foundation layer contains an epoxy resin.

7. An electronic light control lens, comprising the curved surface resin structure according to claim 1.

8. A method for producing the curved surface resin structure according to claim 1, the method comprising:
placing the support including the laminate section within the plane of the support, in which at least the conductive layer and the electronic material layer is laminated, in a molding die in a manner to contact the molding die; and
performing insertion injection formation of injecting a resin onto an exposed side of the support to form a resin layer integrally with the support.

9. The method according to claim 8, further comprising:
before the performing insertion injection formation, compression-bonding the support including the laminate section within the plane of the support, in which at least the conductive layer and the electronic material layer is laminated, onto a curved surface molding die that is heated, to plastically deform the support and form the support having a curved surface shape.

10. The method according to claim 8, wherein in the performing insertion injection formation, a thickness of a shape of a resin injection port of the molding die is less than or equal to an average thickness of the curved surface resin structure, and a width of the shape of the resin injection port is greater than the thickness.

11. The method according to claim 8, wherein in the performing insertion injection formation, the resin is injected onto the exposed side of the support to form the resin layer integrally with the support under conditions that a temperature of the molding die is set to a temperature lower than a softening temperature of the resin by 10 degrees C. or more and a dwelling pressure is set to 100 MPa or higher but 150 MPa or lower.

12. The method according to claim 8, wherein the resin is a polycarbonate resin, and
a temperature of the molding die is 40 degrees C. or higher but 120 degrees C. or lower.

* * * * *